(12) United States Patent
Yoshizawa et al.

(10) Patent No.: US 7,535,594 B2
(45) Date of Patent: May 19, 2009

(54) SCANNING LENS FOR OPTICAL SCANNER, OPTICAL SCANNER, AND IMAGE FORMING APPARATUS

(75) Inventors: Hiroshi Yoshizawa, Kanagawa (JP); Masato Yokoyama, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1012 days.

(21) Appl. No.: 10/784,933

(22) Filed: Feb. 25, 2004

(65) Prior Publication Data

US 2004/0179087 A1    Sep. 16, 2004

(30) Foreign Application Priority Data

Feb. 25, 2003  (JP) ............................. 2003-047367
Feb. 28, 2003  (JP) ............................. 2003-052722

(51) Int. Cl.
*G06F 15/00* (2006.01)
*H04N 1/46* (2006.01)

(52) U.S. Cl. .................... 358/1.4; 358/1.5; 358/1.9; 358/526

(58) Field of Classification Search ............... 358/1.4, 358/1.5, 1.9, 526; 347/19, 224
See application file for complete search history.

(56) References Cited

U.S. PATENT DOCUMENTS

| | | | |
|---|---|---|---|
| 5,321,483 A | 6/1994 | Yokoyama et al. | |
| 5,719,684 A | 2/1998 | Ohkaji et al. | |
| 5,799,229 A | 8/1998 | Yokoyama et al. | |
| 5,878,317 A | 3/1999 | Masuda et al. | |
| 5,946,529 A | 8/1999 | Sato et al. | |
| 5,963,240 A | 10/1999 | Shinohara et al. | |
| 6,317,147 B1 * | 11/2001 | Tanaka .................. | 347/116 |
| 6,593,951 B2 | 7/2003 | Yokoyama et al. | |
| 6,634,640 B1 | 10/2003 | Yoshizawa et al. | |
| 2002/0090228 A1 * | 7/2002 | Takahashi et al. ........... | 399/111 |
| 2002/0192000 A1 | 12/2002 | Yasui et al. | |

FOREIGN PATENT DOCUMENTS

| | | |
|---|---|---|
| JP | 03-142412 | 6/1991 |
| JP | 03-168715 | 7/1991 |
| JP | 04-309916 | 11/1992 |
| JP | 9-269455 | 10/1997 |
| JP | 09-314899 | 12/1997 |
| JP | 10-090618 | 4/1998 |
| JP | 10-221618 | 8/1998 |
| JP | 11-72732 | 3/1999 |

(Continued)

OTHER PUBLICATIONS

U.S. Appl. No. 10/437,135, filed May 13, 2003.

(Continued)

*Primary Examiner*—Houshang Safaipour
(74) *Attorney, Agent, or Firm*—Oblon, Spivak, McClelland, Maier & Neustadt, P.C.

(57) ABSTRACT

A scanning lens for an optical scanner includes a specific adjusting axis and a curved surface. The specific adjusting axis makes a rotating center of the scanning lens and center of the curved surface. The scanning lens is disposed on a holding member having a receiving surface, so that the curved surface is in contact with the receiving surface. A position of the scanning lens is adjusted by a rotating mechanism that rotates the scanning lens.

8 Claims, 17 Drawing Sheets

FOREIGN PATENT DOCUMENTS

| | | |
|---|---|---|
| JP | 11-153765 | 6/1999 |
| JP | 11-212011 | 8/1999 |
| JP | 2000-075232 | 3/2000 |
| JP | 3111515 | 9/2000 |
| JP | 2000-275559 | 10/2000 |
| JP | 2001-142012 | 5/2001 |
| JP | 2002-148541 | 5/2002 |
| JP | 2002-148550 | 5/2002 |
| JP | 2002-148551 | 5/2002 |
| JP | 2002-277792 | 9/2002 |

OTHER PUBLICATIONS

U.S. Appl. No. 09/374,133, filed Aug. 10, 1999.
U.S. Appl. No. 09/375,988, filed Aug. 16, 1999.
U.S. Appl. No. 10/218,471, filed Aug. 14, 2002, Yasui et al.
U.S. Appl. No. 09/330,669, filed Jun. 11, 1999.
U.S. Appl. No. 10/247,644, filed Sep. 20, 2002, Yoshizawa.
U.S. Appl. No. 10/323,808, filed Dec. 20, 2002, Yoshizawa.
U.S. Appl. No. 10/784,933, filed Feb. 25, 2004, Yoshizawa et al.
U.S. Appl. No. 10/893,391, filed Jul. 19, 2004, Yokoyama et al.

* cited by examiner

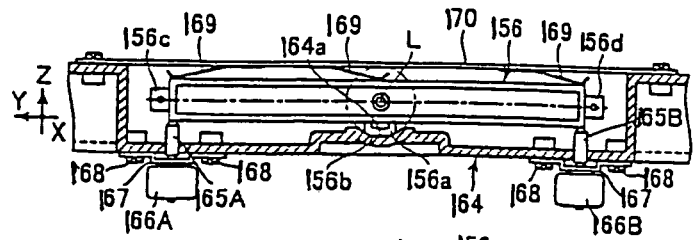
FIG.5A
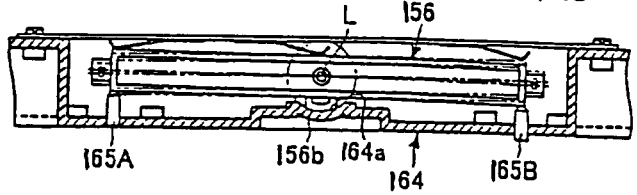
FIG.5B
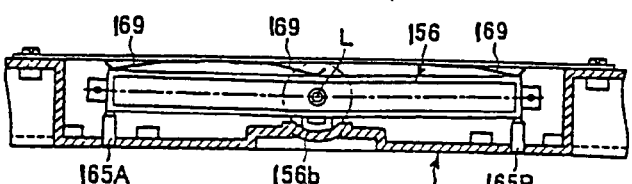
FIG.5C
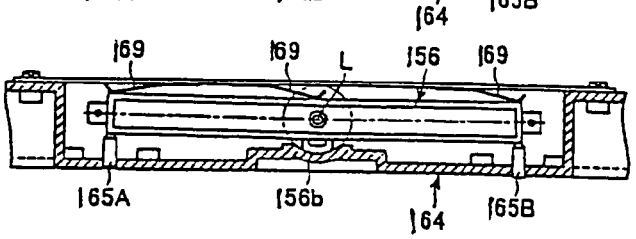
FIG.5D
FIG.6
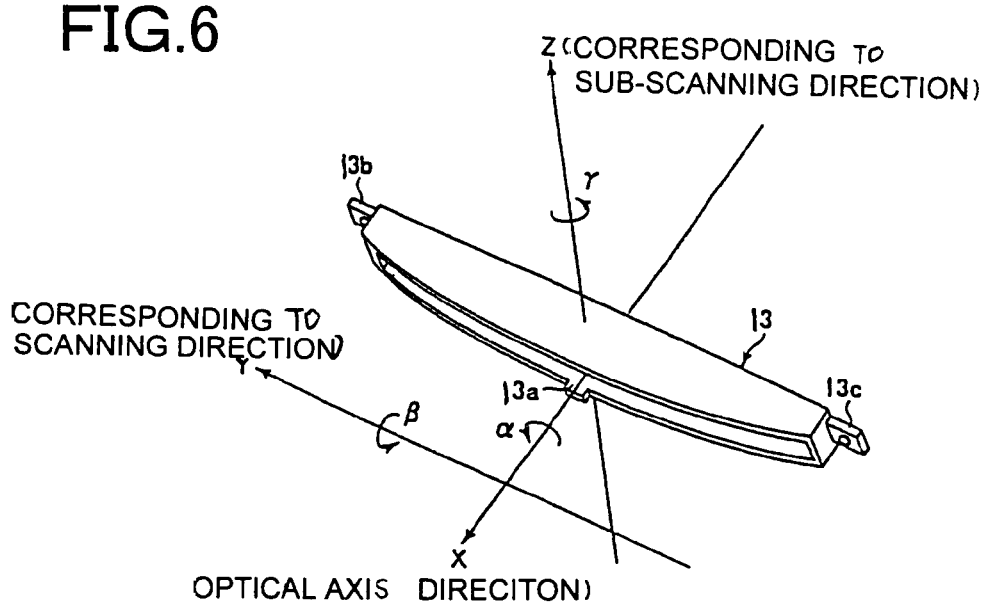

FIG.25
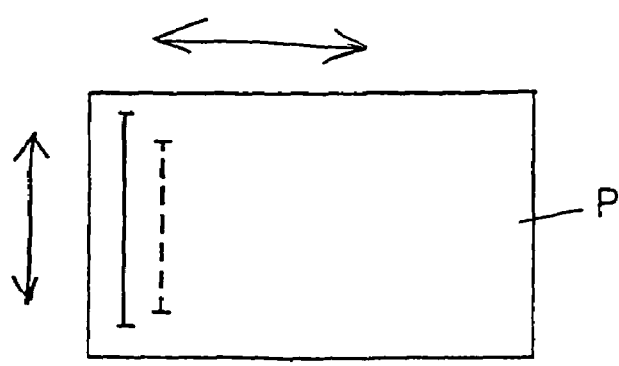
FIG.26
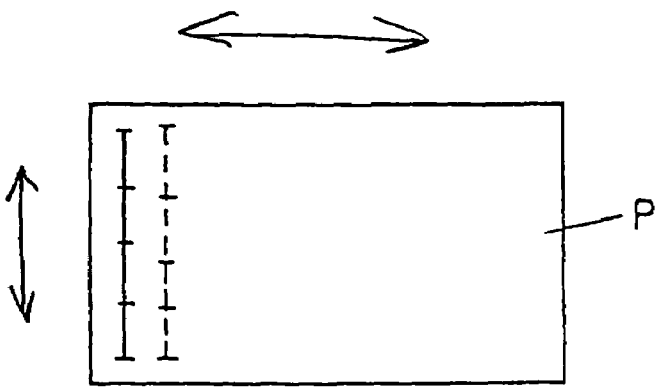
FIG.27A
FIG.27B
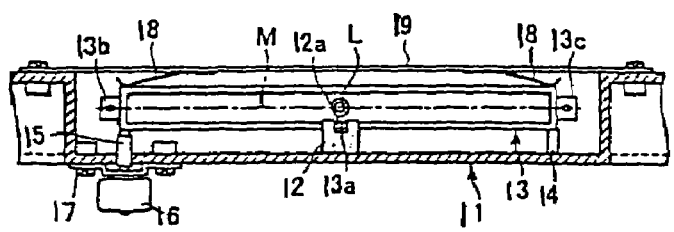

SCANNING LENS FOR OPTICAL SCANNER, OPTICAL SCANNER, AND IMAGE FORMING APPARATUS

CROSS-REFERENCE TO RELATED APPLICATIONS

The present document incorporates by reference the entire contents of Japanese priority documents, 2003-052722 filed in Japan on Feb. 28, 2003 and 2003-047367 filed in Japan on Feb. 25, 2003.

BACKGROUND OF THE INVENTION

1) Field of the Invention

The present invention relates to an image forming apparatus that forms an image on an image carrier, and records the image on a recording medium, an optical scanner that scans the image carrier to write the image on the image carrier, and a scanning lens that transmits a light for scanning.

2) Description of the Related Art

Color image forming apparatuses equipped with optical scanners that irradiate optical beams onto surfaces of a plurality of image carriers to be scanned and write a latent image on the image carriers include full-color copiers, optical printers, facsimiles, and plotters.

In the optical scanners mounted on the image forming apparatuses, it is desired that positional misalignment (relative location-related characteristics) of scanning lines is not formed on a surface of the image carrier to be scanned. Examples of the misalignments of scanning lines are illustrated in FIG. 21 to FIG. 26.

The line of an image formed on a transfer paper P extending in a main scanning direction is indicated by broken line, and the line of an ideal position is indicated by solid line respectively. The main scanning direction refers to a direction in which the optical scanner writes in the recording medium, and a sub-scanning direction refers to a direction in which the recording medium moves orthogonal to the main scanning direction. Moreover, the solid line and the broken line shown in FIG. 21 to FIG. 26 have an overlapping part with each other. However, for convenience of drawing, the broken line is illustrated at a position slightly shifted from the solid line in the sub-scanning direction.

FIG. 21 is a schematic diagram for illustrating a case where scanning lines extending in a main scanning direction is deviated in parallel along the sub-scanning direction (resist deviation). Poor performance of an optical element such as a lens disposed on an optical path of the optical scanner, inaccuracy of geometric arrangement of the respective optical elements, and a displacement due to thermal expansion of the respective optical elements and holding members cause such a problem.

FIG. 22 is a schematic diagram for illustrating a case where the scanning line is inclined to the sub-scanning direction with respect to an ideal scanning line extending in the main scanning direction. Poor performance of the optical elements and inaccuracy of the geometric arrangement of the respective optical elements cause this problem.

FIG. 23 is a schematic diagram for illustrating a case where the scanning line is curved in the sub-scanning direction with respect to the ideal scanning line extending in the main scanning direction. Poor performance of the optical elements and inaccuracy of the geometric shape or deformation of the respective optical elements cause this problem.

FIG. 24 is a schematic diagram for illustrating a case where a resist deviation in the main scanning direction is generated in a writing position of the scanning line with respect to the ideal scanning line extending in the main scanning direction. This is caused by difference in tilt of a plane of each mirror of a plurality of mirrors provided in a polygon mirror reflector, or by difference in an amount of light according to an image forming mode. Moreover, when a multi-beam scanning method is used, which is a method for forming N scanning lines in the sub-scanning direction using a plurality of laser diodes (LDs) by single optical scanning, the above resist deviation is generated due to a slight difference in each LD wavelength.

FIG. 25 is a schematic diagram for illustrating a case where magnification deviation is generated in the scanning line with respect to the ideal scanning line extending in the main scanning direction. This is caused by poor performance of the optical element and inaccuracy of the geometric arrangement of the respective optical elements. Further, this is caused by a displacement due to the thermal expansion of the respective optical elements and the holding members, or a slight difference in each LD wavelength when the multi-beam scanning method is used.

FIG. 26 is a schematic diagram for illustrating a case where a position of the scanning line written actually dose not correspond to an ideal position because scanning speed in the main scanning direction is microscopically different. This is caused by poor performance of the optical element and inaccuracy of the geometric arrangement of the respective optical elements, and a displacement due to the thermal expansion of the respective optical elements and the holding members.

Conventionally, as described in Japanese Patent Laid Open No. 11-72732, for example, some of the optical scanners have an arrangement to prevent deterioration of fθ characteristics generated due to an arrangement error, which is generated from a processing error of a lens and a processing error of an optical housing for supporting the lens, by rotatably adjusting the lens.

The fθ characteristics can surely be prevented. However, an adjusting shaft cannot be decided uniquely, and positions in an optical axis direction and in the main scanning direction are changed simultaneously with rotation of the lens, resulting in another problem that other characteristics are deteriorated.

In addition, as shown in FIG. 27A, in some cases, by rotatably adjusting the lens, the inclination of the scanning line shown in FIG. 22 is corrected.

Reference numeral 11 in the figure indicates an optical housing. An engagement projection 12 is provided in the center of the bottom of the optical housing 11 in an upper direction. An engaging groove 12a is provided on a tip surface of the engagement projection 12, and a projecting part 13a is fitted into the engagement groove 12a, thereby disposing a long-sized toroidal lens 13 within the optical housing 11.

One end of the long-sized toroidal lens 13 is placed on a fixing projection 14 provided in the optical housing 11. The other end thereof is placed on a feed screw 15. The feed screw 15 is fitted to a tip of a driving shaft of a drive motor 16, and screwed to the optical housing 11. The drive motor 16 is fixed to the optical housing 11 with a fixing screw 17. The toroidal lens 13 within the optical housing 11 is pressed from upside by a plurality of leaf springs 18. The leaf springs 18 are supported respectively by a bracket 19 to be fixed by screwing to the optical housing 11.

The toroidal lens 13 is formed by setting an optical direction as the X-axis, a corresponding main scanning direction orthogonal thereto as the Y-axis, and a corresponding sub-scanning direction orthogonal to those as the Z-axis. The X, Y, Z axially rotating directions are set to $\alpha$, $\beta$, and $\gamma$, respectively.

Then, a position in the X-axial direction is decided by hitting projection pieces 13b and 13c of both ends of the toroidal lens 13 to a part (not shown) of the optical housing 11 respectively by energizing with the leaf springs (not shown). A position in the Y-axial direction is decided by fitting the projection part 13a into an engagement groove 12a. A position of the Z-axial direction is decided by pressing both ends of the toroidal lens 13 against the fixing projection 14 and the feed screw 15 with the leaf springs 18.

When correcting the inclination of the scanning line, the feed screw 15 is screwed in by driving the drive motor 16, thereby rotating the toroidal lens 13 in a direction of α by setting the fixing projection 14 as a supporting point. Then, as shown in FIG. 27B, an optical axis L is moved from an ideal position, and the line N connecting vertexes R of the toroidal lens 13 is positioned extremely different from the passing position M of the ideal scanning line. Accordingly, the image pick-up performance in a direction of Z, that is, in a corresponding sub-scanning direction is deteriorated. In a lens having power in the corresponding sub-scanning direction such as the toroidal lens 13, it is conventionally known that a scanning line curve as shown in FIG. 23 can be changed by changing the curve in the direction of Z so that the inclination of the scanning line can be adjusted by rotational adjustment.

The Japanese Patent Laid Open No. 11-72732 discloses a method for adjusting the scanning line curve as shown in FIG. 23, by fixing both end parts of a cylindrical lens corresponding to the aforementioned toroidal lens 13 in the direction of Z and moving a center part thereof.

However, even in this example, it is easily conceivable that the optical axis of the lens is undesirably moved from a target position by adjusting the scanning line curve. This also results in deteriorating the pick-up performance in the sub-scanning direction.

Moreover, for example, the conventional optical scanner includes the one described in Japanese Patent Laid Open No. 2001-142012 as an optical scanner capable of changing the position of the scanning line in the sub-scanning direction.

The Japanese Patent Laid Open No. 2001-142012 discloses the optical scanner in which a part formed in a hemispherical shape provided at tip of a rod is pressed against the longitudinal center lower part of the mirror formed on an optical path by energizing force of a spring, back end side of the rod is engaged with gear parts of a stepping motor through a different gear, the stepping motor is rotated, thereby causing the rod to perform forward/backward motion, and according to a moving amount of the rod, an angle of reflection of the mirror in the sub-scanning direction is changed.

However, in a method conducted by the aforementioned conventional optical scanner for adjusting a resist deviation of the scanning line in the sub-scanning direction by adjusting emission timing, a minimum adjusting resolution corresponds to one-scan in the main scanning direction. For example, when the adjusting resolution is 600 dpi, a scanning range becomes larger to be about 42.3 μm, thereby lowering the alignment accuracy.

In addition, the Japanese Patent Laid Open No. 2001-142012 discloses an optical scanner in which with the rotation of the stepping motor, a plurality of gears are accordingly rotated to cause the rod to conduct forward/backward motion. Then, by moving back and forth of the rod, the position in the central lower end part of the mirror is changed, thereby changing the angles of reflection of the mirror in the sub-scanning direction. Therefore, an amount of change in the sub-scanning direction of the mirror with respect to the angles of displacement of the mirror becomes large, thereby posing a problem such that resolution becomes large accordingly.

SUMMARY OF THE INVENTION

It is an object of the present invention to solve at least the problems in the conventional technology.

The scanning lens for an optical scanner, according to one aspect of the present invention includes a curved surface and having a specific adjusting axis. The specific adjusting axis is a rotating center of the scanning lens and center of the curved surface. The scanning lens is disposed on a holding member in such a manner that the curved surface is in contact with a receiving surface of the holding member. A position of the scanning lens is adjusted by a rotating mechanism that rotates the scanning lens.

The optical scanner according to another aspect of the present invention includes a curved surface centering around an optical axis, a scanning lens holding member that holds the scanning lens, having a receiving surface that supports the curved surface, and an adjustment member that rotates the scanning lens, with the optical axis as a rotating center, to adjust a position of the scanning lens.

The optical scanner according to still another aspect of the present invention includes a scanning lens that is disposed in a main scanning direction as a longitudinal direction, and that transmits light from a light source, a scanning lens holding member that holds the scanning lens so that the scanning lens is movable in a sub-scanning direction, and an adjustment unit including two eccentric members that are disposed on both ends of the scanning lens, and rotate centering around each of supporting axes that are perpendicular to both the main scanning direction and the sub-scanning direction, respectively, and an eccentric amount adjustment unit that respectively adjusts eccentric amounts of the eccentric members. Outer surfaces of each of the eccentric members make a contact with the both ends of the scanning lens, respectively. Both ends of the scanning lens are displaced in a sub-scanning direction based on the eccentric amounts that change with a rotation of the eccentric members.

The optical scanner according to still another aspect of the present invention includes a scanning lens that is disposed in a main scanning direction as a longitudinal direction, and that transmits light from a light source, a scanning lens holding member that holds the scanning lens so that the scanning lens is movable in a sub-scanning direction, and an adjustment unit that is disposed on each of longitudinal ends of the scanning lens, and that displaces the longitudinal ends in the sub-scanning direction. The adjustment unit is provided with an actuator that is driven electrically.

The image forming apparatus according to still anther aspect of the present invention includes an optical scanner having a scanning lens having a curved surface centering around an optical axis, a scanning lens holding member that holds the scanning lens, having a receiving surface that supports the curved surface, and an adjustment member that rotates the scanning lens, with the optical axis as a rotating center, to adjust a position of the scanning lens.

The image forming apparatus according to still another aspect of the present invention includes an optical scanner having a scanning lens that is disposed in a main scanning direction as a longitudinal direction, and that transmits light from a light source, a scanning lens holding member that holds the scanning lens so that the scanning lens is movable in a sub-scanning direction, and an adjustment unit including two eccentric members that are disposed on both ends of the scanning lens, and rotate centering around each of supporting axes that are perpendicular to both the main scanning direction and the sub-scanning direction, respectively, and an eccentric amount adjustment unit that respectively adjusts eccentric amounts of the eccentric members. Outer surfaces of each of the eccentric members make a contact with the both ends of the scanning lens, respectively. Both ends of the scanning lens are displaced in a sub-scanning direction based on the eccentric amounts that change with a rotation of the eccentric members.

The optical scanner according to still another aspect of the present invention includes an optical scanner having a scanning lens that is disposed in a main scanning direction as a longitudinal direction, and that transmits light from a light source, a scanning lens holding member that holds the scanning lens so that the scanning lens is movable in a sub-scanning direction, and an adjustment unit that is disposed on each of longitudinal ends of the scanning lens, and that displaces the longitudinal ends in the sub-scanning direction. The adjustment unit is provided with an actuator that is driven electrically.

The color image forming apparatus includes an optical scanner having a scanning lens having a curved surface centering around an optical axis, a scanning lens holding member that holds the scanning lens, having a receiving surface that supports the curved surface, and an adjustment member that rotates the scanning lens, with the optical axis as a rotating center, to adjust a position of the scanning lens and N image carriers on each of which a latent image is formed. The optical scanner has N optical paths so that the latent image is formed on each of the N image carriers through the N optical paths. The adjustment member is disposed on each of N−1 optical paths among the N optical paths.

The color image forming apparatus according to still another aspect of the present invention includes an optical scanner having a scanning lens that is disposed in a main scanning direction as a longitudinal direction, and that transmits light from a light source, a scanning lens holding member that holds the scanning lens so that the scanning lens is movable in a sub-scanning direction, and an adjustment unit including two eccentric members that are disposed on both ends of the scanning lens, and rotate centering around each of supporting axes that are perpendicular to both the main scanning direction and the sub-scanning direction, respectively; and an eccentric amount adjustment unit that respectively adjusts eccentric amounts of the eccentric members, and N image carriers on each of which a latent image is formed. Outer surfaces of each of the eccentric members make a contact with the both ends of the scanning lens, respectively. Both ends of the scanning lens are displaced in a sub-scanning direction based on the eccentric amounts that change with a rotation of the eccentric members. The optical scanner has N optical paths so that the latent image is formed on each of the N image carriers through the N optical paths. The adjustment member is disposed on each of N−1 optical paths among the N optical paths.

The color image forming apparatus according to still another aspect of the present invention includes an optical scanner having a scanning lens that is disposed in a main scanning direction as a longitudinal direction, and that transmits light from a light source, a scanning lens holding member that holds the scanning lens so that the scanning lens is movable in a sub-scanning direction, and an adjustment unit that is disposed on each of longitudinal ends of the scanning lens, and that displaces the longitudinal ends in the sub-scanning direction, and N image carriers on each of which a latent image is formed. The adjustment unit is provided with an actuator that is driven electrically. The optical scanner has N optical paths so that the latent image is formed on each of the N image carriers through the N optical paths. The adjustment member is disposed on each of N−1 optical paths among the N optical paths.

The color image forming apparatus according to still another aspect of the present invention includes N optical scanners, each of the optical scanners having a scanning lens having a curved surface centering around an optical axis, a scanning lens holding member that holds the scanning lens, having a receiving surface that supports the curved surface, and an adjustment member that rotates the scanning lens, with the optical axis as a rotating center, to adjust a position of the scanning lens, and N image carriers on each of which a latent image is formed. The optical scanner has a single optical path. The latent image is formed on each of the N image carriers via the N optical scanners. The adjustment member is disposed on each of N−1 optical scanners.

The color image forming apparatus according to still another aspect of the present invention includes N optical scanners, each of the optical scanners having a scanning lens that is disposed in a main scanning direction as a longitudinal direction, and that transmits light from a light source, a scanning lens holding member that holds the scanning lens so that the scanning lens is movable in a sub-scanning direction, and an adjustment unit having two eccentric members that are disposed on both ends of the scanning lens, and rotate centering around each of supporting axes that are perpendicular to both the main scanning direction and the sub-scanning direction, respectively, and an eccentric amount adjustment unit that respectively adjusts eccentric amounts of the eccentric members, and N image carriers on each of which a latent image is formed. Outer surfaces of each of the eccentric members make a contact with the both ends of the scanning lens, respectively. Both ends of the scanning lens are displaced in a sub-scanning direction based on the eccentric amounts that change with a rotation of the eccentric members. The optical scanner has a single optical path. The latent image is formed on each of the N image carriers via the N optical scanners. The adjustment member is disposed on each of N−1 optical scanners.

The color image forming apparatus according to still another aspect of the present invention includes N optical scanners, each of the optical scanners having a scanning lens that is disposed in main scanning direction as a longitudinal direction, and that transmits light from a light source, a scanning lens holding member that holds the scanning lens so that the scanning lens is movable in a sub-scanning direction, and an adjustment unit that is disposed on each of longitudinal ends of the scanning lens, and that displaces the longitudinal ends in the sub-scanning direction, and N image carriers on each of which a latent image is formed. The adjustment unit is provided with an actuator that is driven electrically. The optical scanner has a single optical path. The latent image is formed on each of the N image carriers via the N optical scanners. The adjustment member is disposed on each of N−1 optical scanners.

The image forming apparatus according to still another aspect of the present invention includes an optical scanner having a scanning lens that is disposed in a main scanning direction as a longitudinal direction, and that transmits light from a light source, a scanning lens holding member that holds the scanning lens so that the scanning lens is movable in a sub-scanning direction, and an adjustment unit that is disposed on each of longitudinal ends of the scanning lens, and that displaces the longitudinal ends in the sub-scanning direction, a plurality of sensors that is disposed in the main scanning direction with a predetermined interval to read a position of an image formed on an image carrier, and a compensating unit that compensates misalignment of the image in the sub-scanning direction by driving the actuator based on information on the position of the image read. The adjustment unit is provided with an actuator that is driven electrically.

The image forming apparatus according to still another aspect of the present invention includes a plurality of optical scanning systems that employs a scanning lens for an optical scanner having a specific adjusting axis and a curved surface. The specific adjusting axis is a rotating center of the scanning lens and center of the curved surface. The scanning lens is disposed on a holding member having a receiving surface, so that the curved surface is in contact with the receiving surface. A position of the scanning lens is adjusted by a rotating mechanism that rotates the scanning lens.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 5A, FIG. 5B, FIG. 5C, and FIG. 5D are schematic diagrams for illustrating an ideal arrangement state, a state of adjusting an inclination of a scanning line, a state of adjusting a curve of the scanning line, another state of adjusting the curve of the scanning line, respectively, of a toroidal lens;

FIG. 6 is a schematic diagram for illustrating each axial direction and corresponding rotating direction of the toroidal lens;

FIG. 25 is a schematic diagram for illustrating a case where magnification deviation is generated in the scanning line with respect to the ideal scanning line extending in the main scanning direction;

FIG. 26 is a schematic diagram for illustrating a case where a position of the scanning line written actually dose not correspond to an ideal position because scanning speed in the main scanning direction is microscopically different; and FIG. 27A and FIG. 27B are schematic diagrams for illustrating an ideal arrangement state, and a state adjusting the inclination of the scanning line, respectively of a conventional toroidal lens.

DETAILED DESCRIPTION

Exemplary embodiments of a scanning lens for optical scanner, an optical scanner, and an image forming apparatus, according to the present invention are explained in detail with reference to the accompanying drawings.

Figure 1:
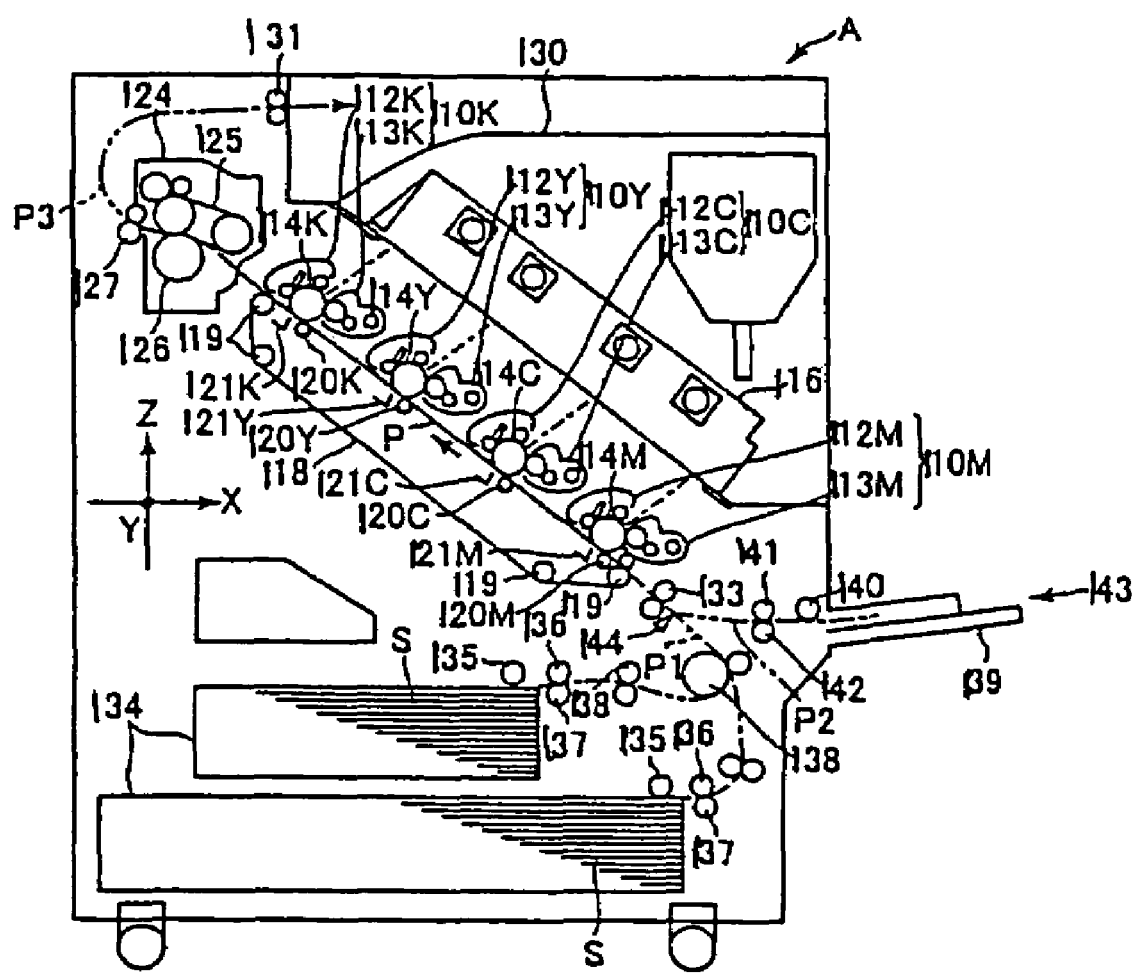
FIG. 1 is a schematic diagram of an electrophotographic full-color copier as an example of an image forming apparatus according to a first embodiment of the present invention.

FIG. 1 is a schematic diagram of an electrophotographic full-color copier as an example of an image forming apparatus according to a first embodiment of the present invention.

In a main body of the copying machine A, a carrying passage P for carrying paper sheets S, which are recording media, is provided from the lower right to the upper left obliquely.

Four image forming means 110M, 110C, 110Y, 110K of magenta, cyan, yellow, black are sequentially arranged in tandem from the lower right to the upper left along the carrying passage P. The respective image forming means 110 include image carrier units 112M, 112C, 112Y, 112K, and developing units 113M, 113C, 113Y, 113K, which are made freely attachable to and detachable from the copier main body A, respectively. The respective image carrier units 112M, 112C, 112Y, 112K include drum-like image carriers 114M, 114C, 114Y, 114K, respectively.

On such image forming means 110M, 110C, 110Y, 110K, an optical scanner 116 is provided obliquely along the image forming means.

Meanwhile, an endless belt type recording medium carrier 118 is stretched under the image forming means 110M, 110C, 110Y, 110K on both sides of the carrying passage P. As shown in FIG. 1, the recording medium carrier 118 is looped about four supporting rollers 119, provided partially along the carrying passage P in contact with the image forming carriers 114M, 114C, 114Y, 114K, and capable of traveling counterclockwisely in the figure by means of a driving device (not shown).

In the inside of the recording medium carrier 118, corresponding to the respective image carriers 114M, 114C, 114Y, 114K, transfer rollers 120M, 120C, 120Y, 120K and transfer brushes 121M, 121C, 121Y, 121K are arranged, respectively.

Along the carrying passage P, paired resist rollers (resist members) 133 are provided on an upstream side of such a recording medium carrier 118, and a fixing unit 124 is provided on a downstream side thereof. In the fixing unit 124, a pressure roller 126 is pressed against a fixing belt 125, which is an endless belt, to form paired discharging rollers 127 at a discharging port.

On the downstream side of the fixing unit 124, a discharge carrying passage P3 continuing from the carrying passage P is formed, and paired discharging rollers 131 for discharging paper sheets S to a discharge stack part 130 on the main body of the copying machine A are provided over the discharge carrying passage P3.

Meanwhile, under the recording medium carrier 118, a paper feeding cassette 134 having upper and lower stages is formed. In the paper feeding cassette 134, paper sheets S having different dimensions are stacked.

On the right side of the paper feeding cassette 134, a sheet supply carrying passage P1 for guiding to paired resist rollers 133 of the carrying passage P is provided.

On the sheet supply carrying passage P1, from the upstream to the downstream, pick up rollers 135 for kicking out paper sheets S from the paper feeding cassette 134, feed rollers 136 and back rollers 137 for separating and delivering them one by one, and a plurality of paired carrier rollers 138 for carrying the paper sheets S while holding them, are provided.

In addition, on the right side of the main body of the copying machine A, a manual feed part 143 is provided, and a manual feed tray 139 is freely openably fitted thereto. On the left side of the manual feed tray 139, a manual feeding supply path P2 for guiding to the above-described paired resist rollers 133 of the carrying passage P is provided.

On the manual feeding supply path P2, from the upstream to the downstream, a pick up roller 140 for kicking out paper sheets S on the manual feed tray 139, and a feed roller 141 and a back roller 142 for separating and delivering them one by one are provided.

In front of the paired resist rollers 133, a resist sensor 144 for detecting a tip of the paper sheet S carried by the paired carrier rollers 138 is provided.

When a copy is obtained on the paper sheet S using the copying machine, by pressing a start switch (not shown) the pick up rollers 135, feed rollers 136, and back rollers 137 are selectively driven, thereby delivering the paper sheets S within the paper feeding cassette 134 by separating them one by one. The delivered paper sheets S are put in the sheet supply carrying passage P1, held between the paired carrier rollers 138, carried, and stopped by butting on the paired resist rollers 133 at butting timing detected by the resist sensor 144.

Alternatively, the pick up roller 140 of the manual feed part 143, the feed roller 141, and the back roller 142 are driven, thereby delivering the paper sheets S on the manual feed tray 139 by separating them one by one. The delivered paper sheets S are put in the manual feeding supply path P2, held by the paired carrier rollers 138, carried, and stopped by butting the paper sheets on the paired resist rollers 133 to be loosened at butting timing detected by the resist sensor 144.

Meanwhile, in each of the image forming means 110M, 110C, 110Y, 110K, each of the image carriers 114M, 114C, 114Y, 114K is rotated to form a monochromatic toner image of magenta, cyan, yellow, and black, respectively on a desired image carrier. Simultaneously, one of the supporting rollers 119 is rotary-driven by a drive motor (not shown) and the other supporting rollers 119 are rotated following the rotation of the one of the supporting rollers, thus rotationally transferring the recording medium carrier 118.

The paired resist rollers 133 are rotated by matching the timing to the image of the image carrier. Then, paper sheets S are put in the carrying passage P, and delivered sequentially toward a transfer position between the image forming means 110M, 110C, 110Y, 110K and the recording medium carrier 118, and carried by driving the recording medium carrier 118. While the paper sheets are carried, the monochromatic toner image on each of the desired carriers 114M, 114C, 114Y, 114K is transferred to a transfer position by transfer brushes 121M, 121C, 121Y, 121K, and a synthetic full color image, two-color image, monochromatic image are formed on the paper sheet S.

The paper sheet S after image transfer is delivered to the fixing unit 124, where the transferred image is fixed, and then guided to a discharge carrying passage P3 to be discharged by the paired discharging rollers 131 and stacked on the discharging stack part 130 in a page order.

Figure 2:
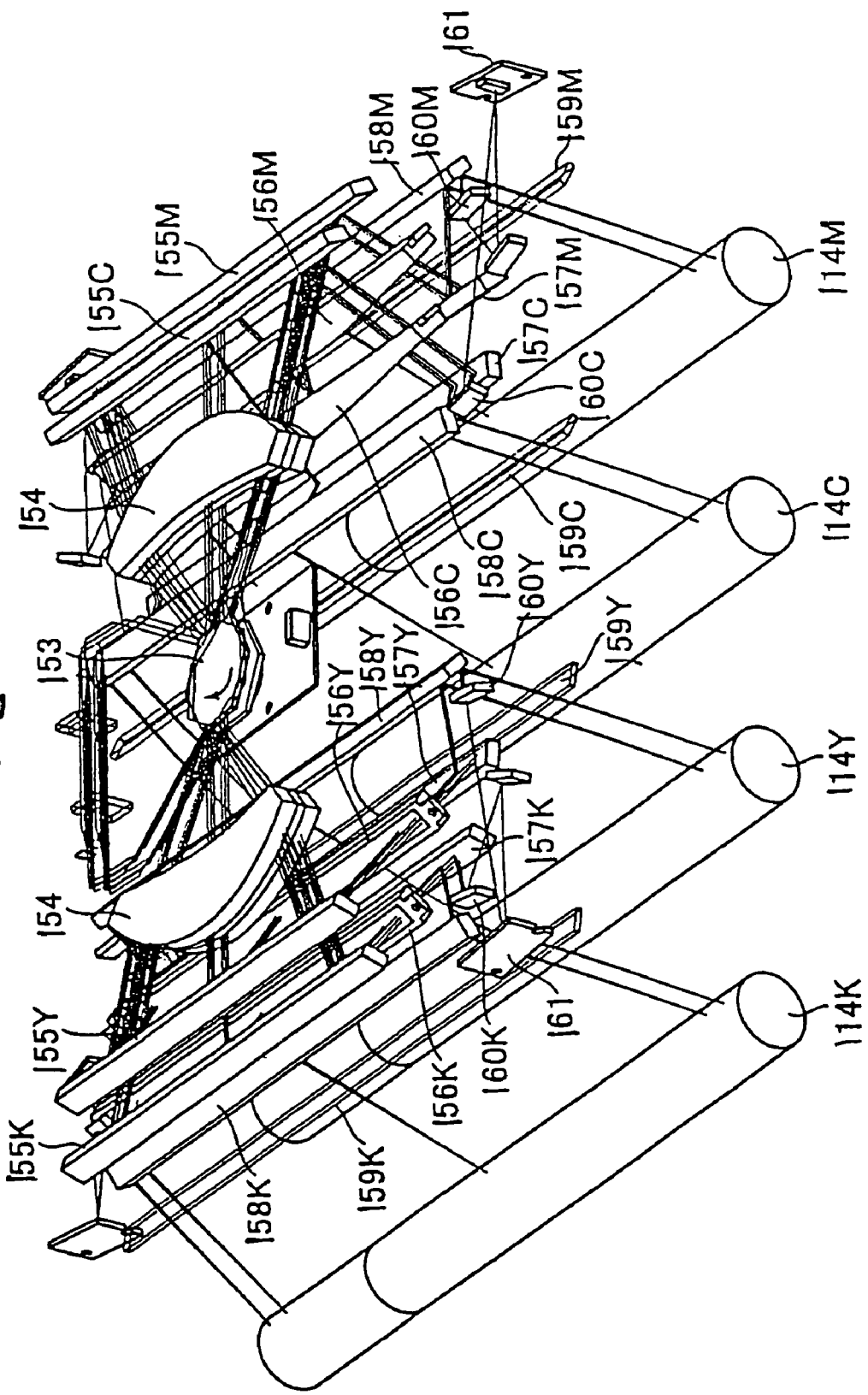
FIG. 2 is a schematic diagram for illustrating a state of writing images on each image carrier with an optical scanner in the electrophotographic full-color copier shown in FIG. 1.
Figure 3:
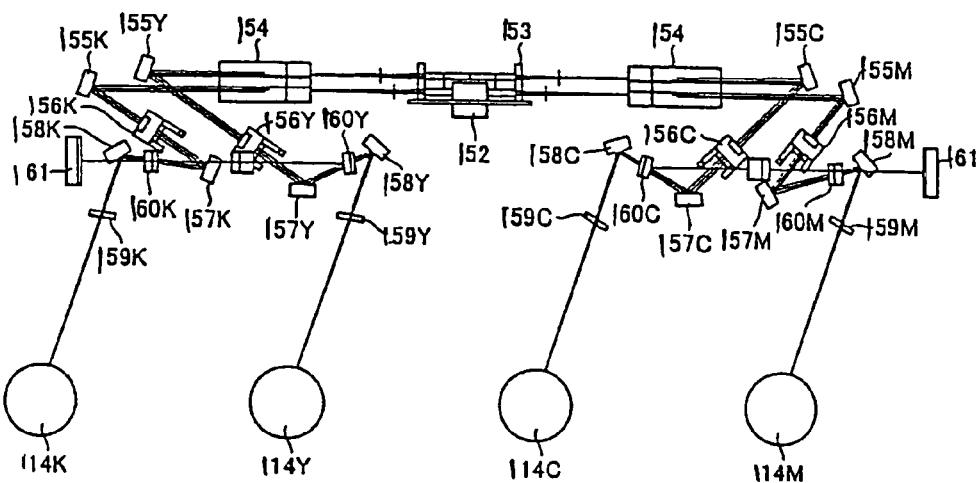
FIG. 3 is an equivalent of FIG. 2 viewed from a front direction.
Figure 4:
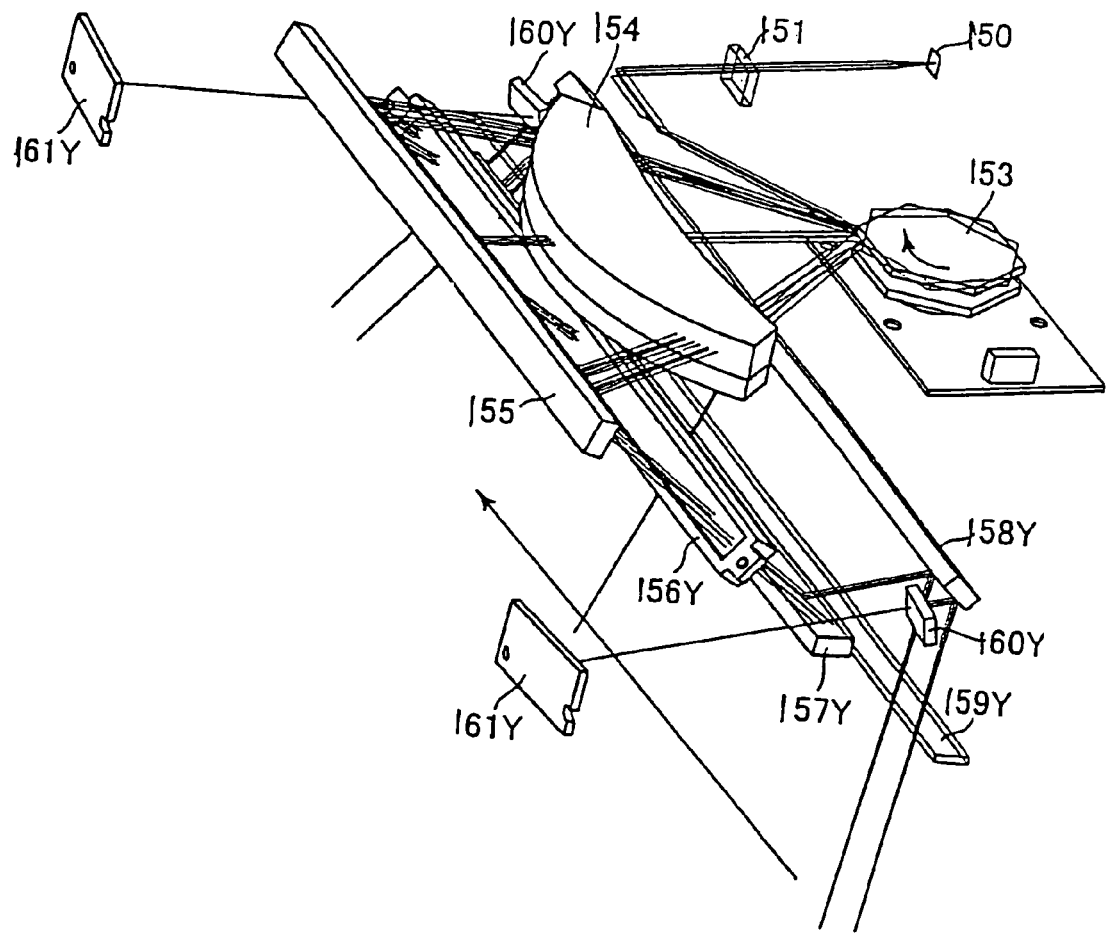
FIG. 4 is a schematic diagram for illustrating a state of writing images on each image carrier in a Y (yellow) station.

FIG. 2 is a schematic diagram for illustrating a state of writing images on each of the image carriers 114M, 114C, 114Y, 114K with the optical scanner 116, in the electrophotographic full-color copier shown in FIG. 1. FIG. 3 is an equivalent of FIG. 2 viewed from a front direction. FIG. 4 is a schematic diagram for illustrating a state of writing images on each image carrier in a Y (yellow) station.

Reference numeral 150 indicates a light source using an LD. Laser beams emitted from the light source 150 pass through a cylindrical lens 151, a polygon mirror 153 rotated by a polygon motor 152, a resin-made fθ lens 154, a first return mirror 155, a toroidal lens 156, a second return mirror 157, a third return mirror 158, and dustproof glass 159, to form an image on the image carrier 114.

Between the second return mirror 157 and the third return mirror 158, a synchronizing mirror 160 is provided. End lights reflected by the synchronizing mirror 160 forms an image on a photodiode of a synchronization detecting plate 161, and writing start timing of each scanning line is set.

Note that an M (magenta) station is represented by M, a C (cyan) station is represented by C, a Y (yellow) station is represented by Y, and a K (black) station is represented by K, which are respectively added after reference numerals 155 to 160.

FIG. 5A, FIG. 5B, FIG. 5C, and FIG. 5D are schematic diagrams for illustrating an ideal arrangement state, a state of adjusting an inclination of a scanning line, a state of adjusting a curve of the scanning line, another state of adjusting the curve of the scanning line, respectively, of a toroidal lens.

As shown in FIG. 5A, the toroidal lens, which is formed in long size, has power in the corresponding sub-scanning direction (Z-axis direction), and has an optical axis L in the longitudinal center in the X-axis direction. On the lower surface thereof, a projection 156a facing downward is formed linearly in the X-axis direction. On the tip surface of the projection, a curved surface 156b, centering around the optical axis L, is provided. Moreover, projection pieces 156c and 156d are projected in the Y-axis direction from the opposite ends in the direction of the length of the toroidal lens.

Such a toroidal lens 156 is housed in an optical housing 164, which is other member, and placed thereon in such a manner that the curved surface 156b is received by a receiving plane 164a so as to be slidable on the curved surface 156b and rotatable in a direction of α centering around the optical axis L, which is an adjuster. In this embodiment, the optical housing 164 corresponds to a scanning lens holding member in which the scanning lens is housed and installed by receiving the curved surface with a receiving plane.

The optical housing 164 has a receiving plane 164a facing upward at the center of the bottom. The receiving plane 164a is curved with a curvature tightly in contact with the curved surface 156b. Feed screws 165A and 165B serving as adjuster members are placed in symmetric positions in the Y-axis direction on both sides of the receiving plane 164a. The feed screws 165A and 165B are attached to drive shafts of drive motors 166A and 166B, which are drive means respectively, and screwed to the optical housing 164, and supported by the optical housing 164. Then, tip ends of the feed screws 165A and 165B are respectively made to hit to both ends of the long-sized toroidal lens 156. Drive motors 166A and 166B are attached to the outside of the optical housing 164 with an attaching screw 168 through an attaching plate 167.

The toroidal lens 156 within the optical housing 164 is pressed from upside by a plurality of leaf springs 169. The leaf springs 169 are supported respectively by a bracket 170 to be screw-fixed to the optical housing 164.

In the toroidal lens 156, as shown in FIG. 6, the optical axial direction is set to be the X-axis, the corresponding main scanning direction orthogonal thereto is set to be the Y-axis, and the corresponding sub-scanning direction orthogonal to those is set to be Z-axis, and X, Y, Z axially rotating directions are set to be α, β, and γ, respectively.

The position of the X-axial direction is decided by hitting the projection pieces 156c and 156d to a part of the optical housing 164 (not shown) by energizing the projection pieces 156c and 156d of both ends of the toroidal lens 156 with leaf springs (not shown). The positions of the Y-axial direction and Z-axial direction are decided by receiving the curved surface 156b by the receiving plane 164a and placing it on the optical housing 164.

When correcting the inclination and curve of the scanning line, for example, a switch button or the like (not shown) is scanned to selectively operate the drive motors 166A and 166B, thereby rotatably adjusting the toroidal lens by screwing in and out the feed screws 165A and 165B. For example, as shown in FIG. 5B, one of the screws 165A is screwed in and the other screw 165B is screwed out to slide the toroidal lens by the curved surface 156b, thus carrying out rotational adjustment centering around the optical axis L along the receiving plane 164a. The inclination from a position indicated by an imaginary line to a position indicated by a solid line is thus corrected.

Moreover, for example, as shown in FIG. 5C, by screwing in both of the feed screws 165A and 165B together, or as shown in FIG. 5D, by screwing in only one of the feed screws 165A, the toroidal lens 156 is subjected to rotary adjustment around the optical axis L, while being pressed by the leaf springs 169, thereby correcting the curve of the scanning line.

In the example described above, when correcting the inclination and curve of the scanning line, a switch button (not shown) is scanned to selectively operate the drive motors 166A and 166B. However, by providing detecting means for detecting the images, the inclination and curve of the scanning line may be detected automatically from image patterns formed on the image carrier 114 or transfer belt. Then, based on a detection result by the detecting means, under feedback control, the drive motors 166A and 166B are operated, thereby driving the feed screws 165A and 165B. In this way also, the inclination and curve of the scanning line may be automatically corrected with the passage of time.

Of course, without using the drive motors 166A and 166B, the rotational adjustment may be applied manually to the adjustment members such as the feed screws 165A and 165B. When an amount of inclination and curve of the scanning line is small, the adjustment may be applied by the optical scanner 116 individually before it is incorporated into the main body of the copying machine A.

The toroidal lens 156 is energized in the X-axis direction and Z-axis direction, however it may be energized in the Y-axis direction also to prevent the toroidal lens from becoming unstable.

Moreover, the curved surface 156b is formed only on the lower surface side of the toroidal lens 156. However the curved surface, centering around the optical axis L, may be formed on the upper surface side also, which is opposite side of the lower surface, with the optical axis L between them. Then, the curved surface thus formed is brought into slidable contact with the receiving plane, which is other member, to freely slide on the curved surface, thus applying rotational adjustment along the receiving plane.

Note that when the adjustment members of the optical scanner is applied to a multi-color image forming apparatus having a plurality of optical scanning systems of magenta, cyan, yellow, and black, and equipped with the toroidal lens 156, which is a scanning lens for optical scanner, then, an image quality can be improved by making the inclination and curve of the scanning line small in each optical scanning system, thereby eliminating color shift between respective colors.

Figure 7:
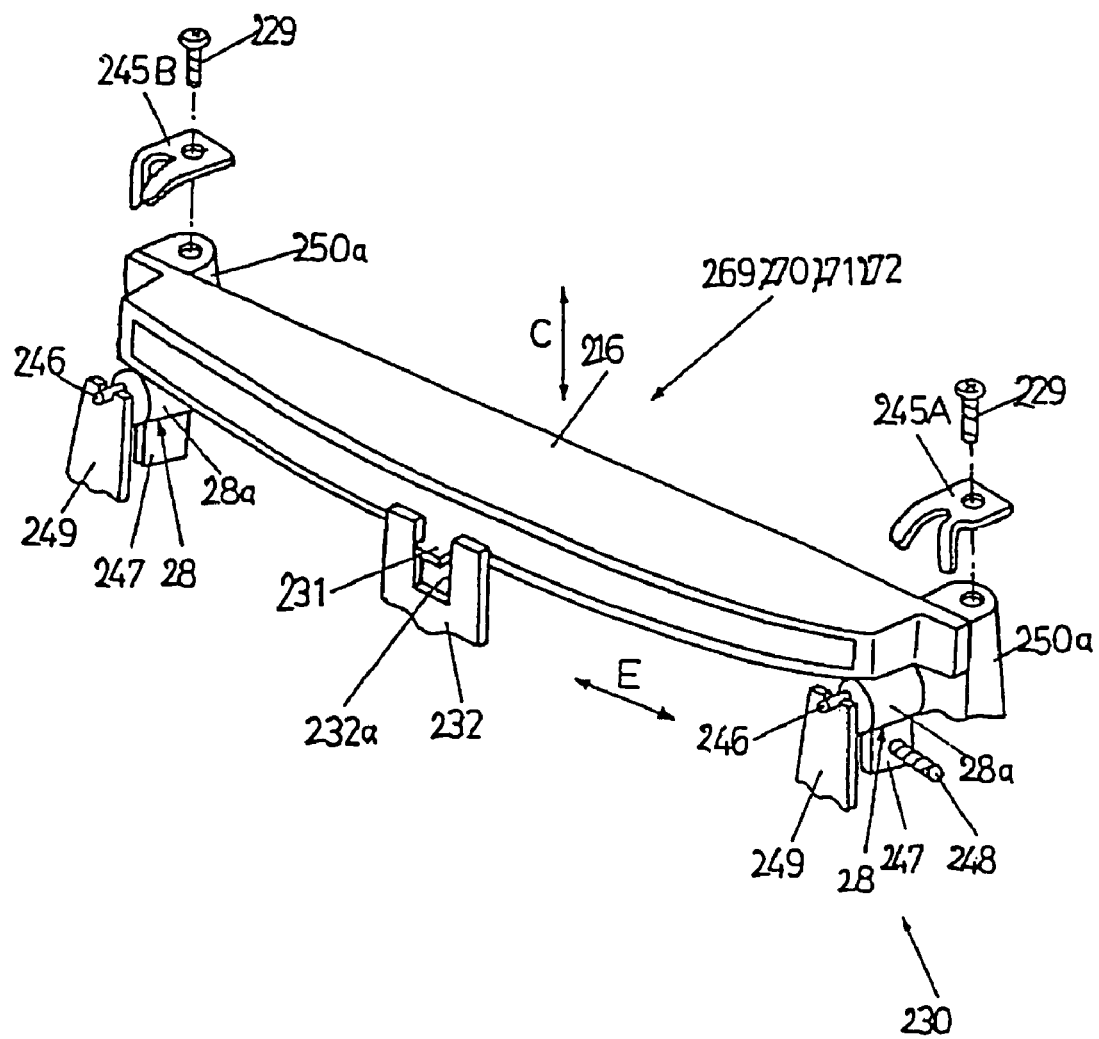
FIG. 7 is a schematic diagram for illustrating a sub-scanning position adjusting mechanism of the optical scanner according to a second embodiment of the present invention.
Figure 8:
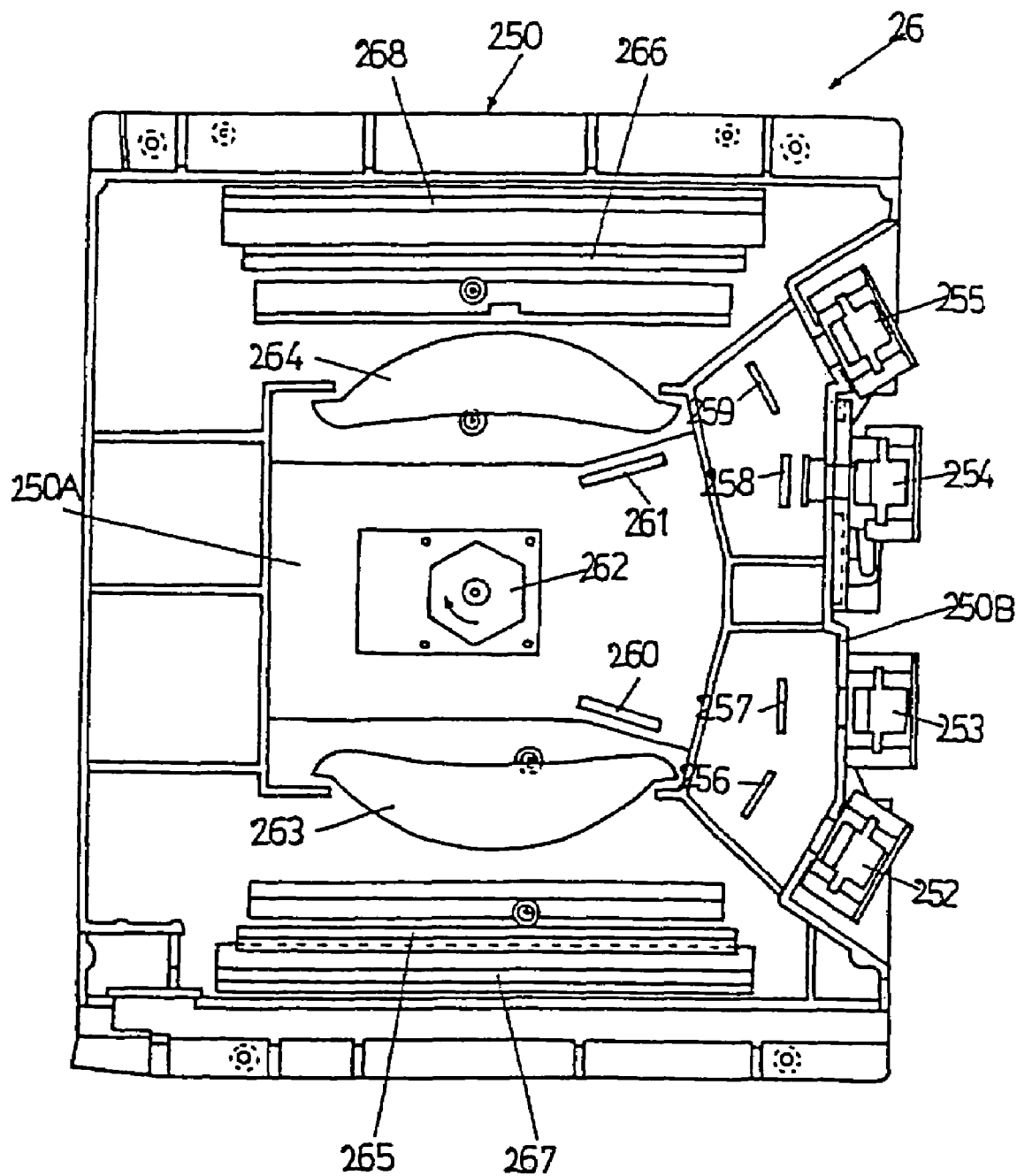
FIG. 8 is a schematic diagram of the optical scanner according to the second embodiment.
Figure 9:
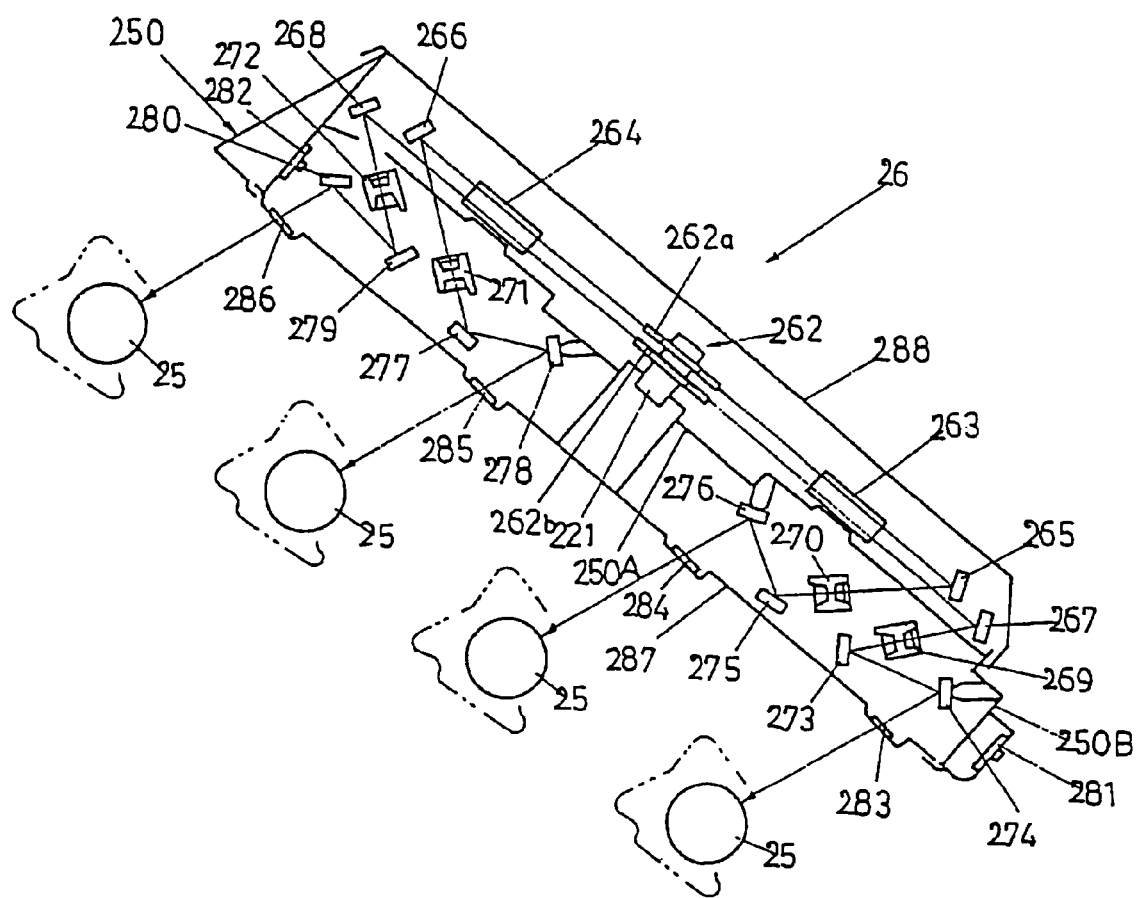
FIG. 9 is a schematic diagram of the optical scanner according to the second embodiment with a plurality of photoreceptor drums.
Figure 10:
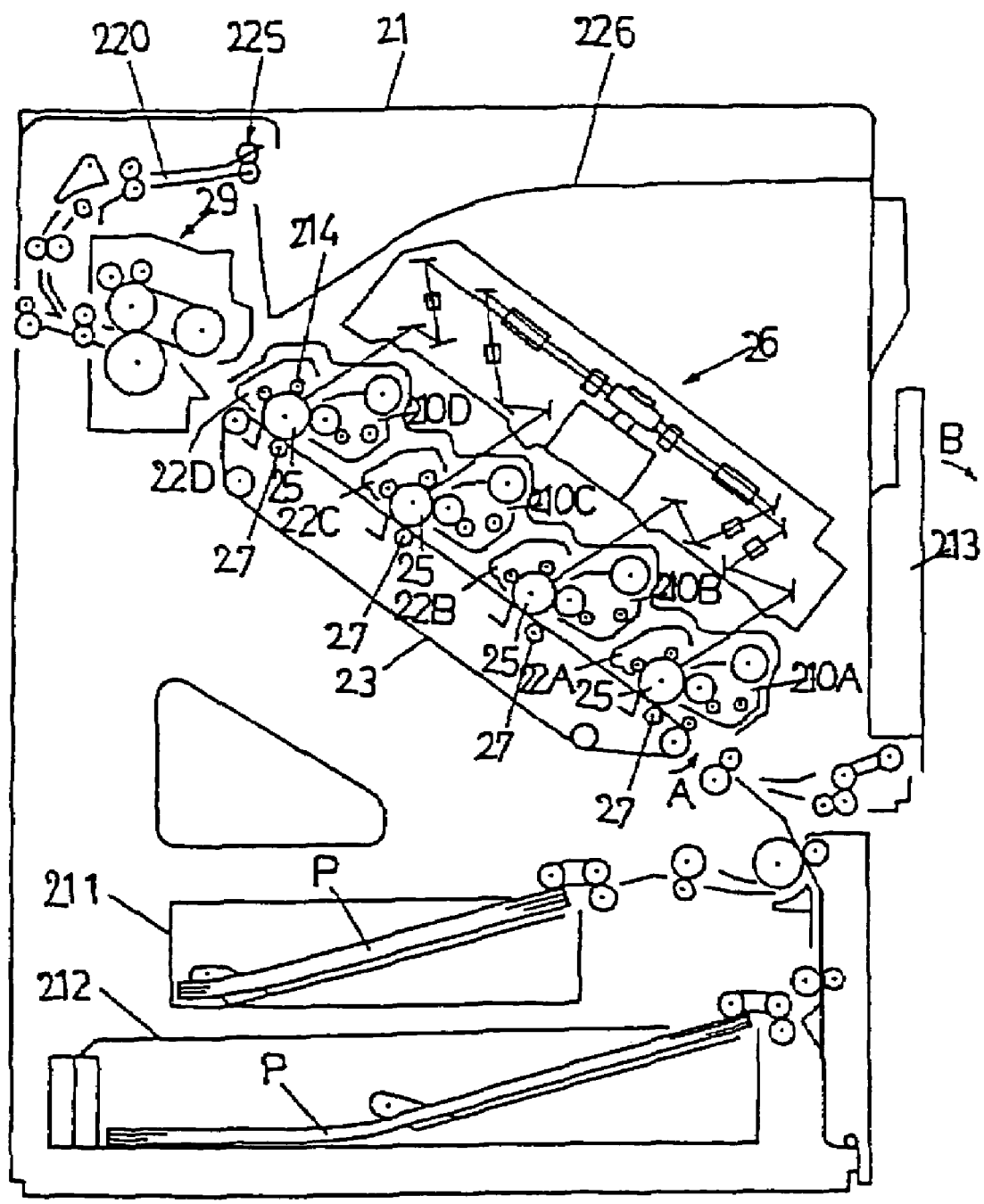
FIG. 10 is a schematic diagram of a color image forming apparatus equipped with the optical scanner according to the second embodiment.

FIG. 7 is a schematic diagram for illustrating a sub-scanning position adjusting mechanism of the optical scanner according to a second embodiment of the present invention. FIG. 8 is a schematic diagram of the optical scanner according to the second embodiment. FIG. 9 is a schematic diagram of the optical scanner according to the second embodiment with a plurality of photoreceptor drums. FIG. 10 is a schematic diagram of a color image forming apparatus equipped with the optical scanner according to the second embodiment.

The image forming apparatus shown in FIG. 10 is a full-color image forming apparatus having photoconductive photoreceptor drums 25, serving as a plurality of image carriers, disposed in parallel with each other in an apparatus main body 21. The four photoreceptor drums 25 are designed to form images corresponding to each color of yellow (Y), magenta (M), cyan (C), and black (Bk) in sequence from right in the figure (the order of the colors other than these colors can be set optionally).

In the circumferential part of the four photoreceptor drums 25, an electrifying section for conducting image forming by an electrophotographic process (an electrifying roller is shown in the figure, however an electrifying brush or an electrifying charger or the like may be alternatively used) 214, developing devices 210A, 210B, 210C, 210D and cleaning devices 22A, 22B, 22C, 22D are provided respectively.

Moreover, above the respective photoreceptor drums 25, an optical scanner 26 is provided, so that electrified faces of the photoreceptor drums 25 respectively electrified by each electrifying section 214 are exposed by light beams. In addition, in approximately the center of the apparatus main body 21, a transfer belt 223 is rotatably tensed among a plurality of rollers in a direction of A shown by an arrow, so that an upper face of the belt of the transfer belt 223 is in contact with four photoreceptor drums 25 respectively.

In a back face side of the transfer belt 223, and at a position opposed to each photoreceptor drum 25, transfer devices (in configuration of FIG. 10, transfer rollers are shown, however a transfer brush may be alternatively used.) 27 are disposed respectively.

Further, on the downstream side of the transfer belt 223 in a carrying direction of the transfer paper, a fixing device 29 for fixing the image of the transfer paper is provided. On the downstream side of the fixing device 29 in the carrying direction of the transfer paper, a reverse carrying passage 220 is branched, so that the carried transfer paper P can be discharged on a discharging tray 226 by paired discharging rollers 225.

Meanwhile, at the lower part in the apparatus main body 21, paper feeding cassettes 211 and 212 having upper and lower stages are disposed, so that the transfer paper sheets having different dimensions can be stacked.

Further, on the right side of the apparatus main body 21, a manual insertion tray 213 is provided free to open and close in a direction of B shown by an arrow, so that a manual insertion paper feed can be carried out by opening the manual insertion tray 213.

In the image forming apparatus, light beams emitted from a plurality of light sources of the optical scanner 26 are irradiated onto four photoreceptor drums 25 disposed in parallel to write an electrostatic latent image thereon. Then, the electrostatic latent image formed on each photoreceptor drum 25 is developed by developers of four different colors (for example, toners) of yellow, magenta, cyan, and black, respectively to develop it to be a visible image.

Meanwhile, the transfer paper P is fed at predetermined timing from the feeding cassettes 211 and 212, or from the manual insertion tray 213, and when it is carried on the transfer belt 223 and carried, by sequentially superposing the toner image on each photoreceptor drum 25 onto the transfer paper P, the toner image on the transfer material P is fixed by the fixing device 29 and discharged to the outside of the machine or on the discharging tray 226.

The optical scanner 26 is disposed in a housing 250 shown in FIG. 8 setting the main scanning direction as a longitudinal side, and is provided with image forming lenses 269, 270, 271, 272 shown in FIG. 9 so that the light beams emitted from each of the light source units 252, 253, 254, 255 pass through respectively.

Moreover, the optical scanner 26 includes a scanning lens holding member for holding the image forming lenses 269, 270, 271, 272 in a moving capable manner in a direction of C shown by an arrow, which is the sub-scanning direction respectively shown in FIG. 7 (each constitution near the four image forming lenses 269, 270, 271, 272 is shared by one figure for simplifying explanation).

The scanning lens holding members according to the second embodiment include a pair of housing attachment parts 250a and 250b formed in a housing 250 (see FIG. 8 and FIG. 9), eccentric cams 28 and 28 supporting the underside at both ends of a lens case 216 for the image forming lenses from downside, and presser springs 245A and 245B pressing the upperside at both ends of the lens case 216 from upside respectively.

Moreover, the optical scanner 26 is equipped with an adjustment member 230 including eccentric members and an eccentric amount adjustment member. As the eccentric members, eccentric cams 28 are formed in pair, whose cam surfaces 28a are in contact with the downside at both ends of each lens case 216 of the image forming lenses 269, 270, 271, 272. The cam surfaces serve as outer circumferential faces by rotating centering around the respective support shafts 246. The respective support shafts 246 and 246 are disposed at longitudinal both ends of the image forming lenses 269, 270, 271, 272, so as to be orthogonal to the main scanning direction (in a direction of E shown by an arrow) and also orthogonal to the sub-scanning direction (in a direction of C shown by an arrow). Meanwhile, the eccentric amount adjustment member includes presser plates 247 adjusting eccentric amounts of the eccentric cams 28, and feed screws 248 (in FIG. 7, the feed screw on the back side is concealed). In such an adjustment member 230, according to the eccentric amount, which changes with the rotation of the respective eccentric cams 28, both ends of the respective image forming lenses 269, 270, 271, 272 are displaced in the sub-scanning direction shown by the arrow C.

As shown in FIG. 8, the optical scanner 26 houses optical members in a housing 250, the optical members including an optical deflector 262 for deflecting each light beam emitted from each of the four light source units so as to be distributed to two symmetrical directions to operate scanning, image forming lenses 263 and 264 arranged symmetrically in two directions while setting the deflector 262 as center and respectively guiding the four light beams deflected by the optical deflector 262 to operate scanning on the surfaces to be scanned of the corresponding photoreceptor drums shown in FIG. 9 to form images, scanning lenses (optical system) composed of the above-described respective image forming lenses 269, 270, 271, 272, and a plurality of optical path return mirrors 265, 266, 267, 268, 273, 274, 275, 276, 277, 278, 279, 280.

The housing 250 has a base 250A on which the optical deflector 262 and the optical system are arranged and a frame-like sidewall 250B surrounding the circumference of the base 250A, and has a structure for vertically dividing the housing 250 by arranging the base 250A in the inside of the sidewall 250B.

The four light source units 252, 253, 254, 255 shown in FIG. 8 are arranged on the sidewall 250B of the housing 250, and the optical deflector 262 is arranged in approximately the center part of the base 250A of the housing 250.

Moreover, as shown in FIG. 9, the image forming lenses 263, 264, 269, 270, 271, 272 and the optical path return mirrors 265, 266, 267, 268, 273, 274, 275, 276, 277, 278, 279, 280 are arranged to be separated into upper surface side and lower surface side of the base 250A.

Note that covers 288 and 287 are attached to the upper part and lower part of the housing 250, an opening for passing each light beam through is formed in the cover 287 on the lower part side, and dustproof glasses 283, 284, 285, 286 are attached to each opening.

Note that the image forming lenses 269, 270, 271, 272 are lenses called long-sized toroidal lenses (WTL) which have a power to correct the position of the scanning line in the sub-scanning direction.

In the optical scanner 26, color-separated image data inputted from a document reader (scanner) or image data output device (receiving section of a personal computer, a word processor, a facsimile apparatus or the like) is converted to a signal for driving light source, and according to the signal, a semiconductor laser (LD), which serves as a light source within each of the light source units 252, 253, 254, 255 of FIG. 8, is driven to emit light beams, respectively.

Each light beam emitted from the light source units 252, 253, 254, 255 passes cylindrical lenses 256, 257, 258, 259 for the correction for plane tilts, and directly or through mirrors 260 and 261, reaches the optical deflector 262, thereby being distributed to two symmetrical directions and deflected to make a scan by polygon mirrors 262a and 262b which have vertical two stages and which are rotated at the same speed by a polygon motor 221 as shown in FIG. 9.

Note that in this embodiment, the polygon mirror has a structure having two stages separated into the upper stage and the lower stage for deflecting light beams to operate scanning, wherein two light beams are deflected for scanning by the mirror of the upper stage, and the other two light beams are deflected for scanning by the mirror of the lower stage. However, four light beams may be deflected for scanning by one thick polygon mirror.

The light beams deflected for scanning in two directions for every two beams by the polygon mirrors 262a and 262b of the optical deflector 262 respectively pass through the first image forming lenses 263 and 264 composed of fθ lenses having power to correct the position of the scanning line of vertical two layer-structure in the main scanning direction, for example. The light beams are then made to be returned by the first return mirrors 265, 266, 267, 268 and passed through the opening of the base 251. Thereafter, the light beams pass through the second image forming lenses 269, 270, 271, 272 composed of the long-sized toroidal lenses (WTL) having the power of correcting the position of the scanning line in the sub-scanning direction for example. Through the second return mirrors 273, 275, 277, 279, the third return mirrors 274, 276, 278, 280, and dustproof glasses 283, 284, 285, 286, the light beams are irradiated onto the surfaces to be scanned of the photoreceptor drums 25 corresponding to each color, to write the electrostatic latent images thereon.

Note that the four light source units 252, 253, 254, 255 of the optical scanner 26 explained in FIG. 8 are formed with an LD, which serves as a light source and a collimate lens for collimating the emitting light flux of the semiconductor laser, and they are integrally incorporated into a holder. However, a light source unit for black which is highly frequently used when black and white images are formed (for example, a light source unit indicated by reference numeral 254) may have a multi-beam structure including two or more of light sources and two corresponding collimate lenses, so as to achieve high-speed writing.

When such a multi-beam structure is adopted, and when the light source unit is formed on the sidewall 250B of the housing 250 so as to be rotatable centering around the optical axis, a beam pitch in the sub-scanning direction can be adjusted and pixel density (for example, 600 dpi, 1200 dpi, etc,.) can be changed when black and white images are formed.

Further, synchronization detecting mirrors (not shown) are disposed on four light paths of the respective light beams so that the light flux of a scanning start position in the main scanning direction can be extracted. Then, the light flux reflected by the synchronization detecting mirrors is received by synchronization detectors 281 and 282 as shown in FIG. 9 to output a synchronizing signal of a scanning start.

Note that in deflecting the light beams to make a scan by the optical deflector 262, the scanning direction of the light beams is the main scanning direction, corresponding to the axial direction of each photoreceptor drum 25. In addition, the direction orthogonal to the main scanning direction is the sub-scanning direction (moving direction of the photoreceptor drums 25).

As shown in FIG. 7, each of the eccentric cams 28 and 28 at both ends of the adjustment member 230 is made of a member having some thickness in an optical axial direction (in a light transmission direction) for more stably holding the underside at both ends of each lens case 216 of the image forming lenses 269, 270, 271, 272 with the cam surfaces 28a and 28a. Then, on one end face side of the eccentric cams, the support shafts 246 and 246 are projectingly provided by pressuring so as to be shifted from the center.

Figure 11:
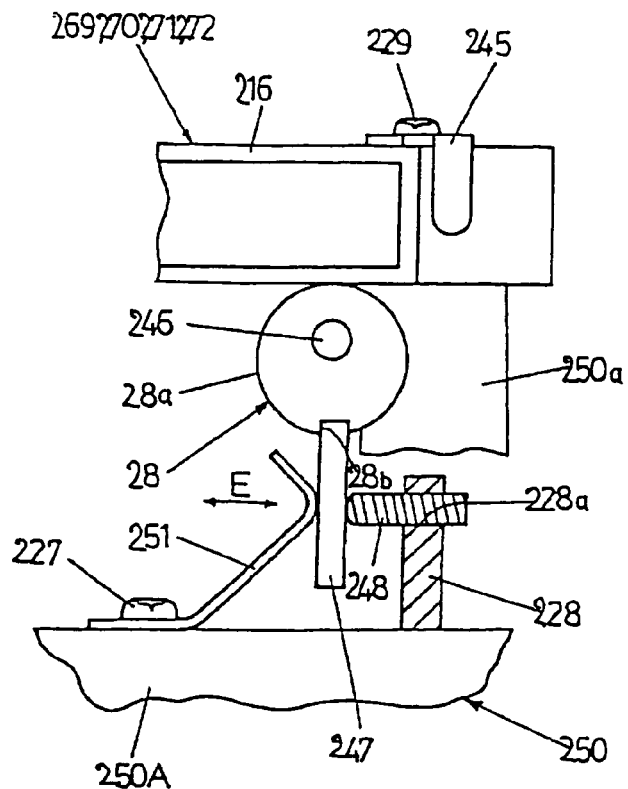
FIG. 11 is a front view of the sub-scanning position adjusting mechanism shown in FIG. 7.

As shown in FIG. 11, the eccentric cam 28 has a vertical groove 28b in an optical axial direction (front and innermost direction in FIG. 11) at a part of the cam surface 28a, which serves as an outer circumferential face, so that the upper end part of the flat plate-like presser plate 247 is fitted into the groove 28b. The presser plate 247 is held by a guide (not shown) so as to be movable only in a direction of E shown by an arrow. Then, the tip of the feed screw 248 is pressed against approximately the center of one face of the presser plate, and a return spring 251 consisting of a leaf spring and disposed opposite to the feed screw 248 is pressed against approximately the center of the other end face of the presser plate.

The return spring 251 is fixed to the base 250A of the housing 250 on the fixing side by a screw 227, for example. Moreover, the feed screw 248 is screwed in a female screw hole 228a formed in a screw holding part 228 fixed to the base 250A.

Each lens case 216 is respectively in contact with a planar part of the housing attachment part 250a formed on the base 250A of the housing 250 on the back sides of both end parts thereof. Moreover, the upper surface of each end part of the lens case 216 is pressed by respective presser springs 245A and 245B (see FIG. 7) consisting of leaf springs fixed to the upper surface of each housing attachment part 250a with screws 229 respectively.

A projection 231 for positioning is projectingly provided in the lower part of approximately the center of the lens case 216 in the longitudinal direction as shown in FIG. 7. The projection 231 is fitted into a recessed groove 232a of a regulating guide 232 formed on the base 250A of the housing 250, to regulate the movement of the lens case 216 in the longitudinal direction (in the main scanning direction of E shown by an arrow).

The adjustment member 230 is thus constituted and therefore when the feed screws 248 are moved back and forth in an axial direction of E shown by an arrow by rotating them, along with this, the presser plates 247 are similarly moved in the direction of E shown by an arrow only by a matching amount of the rotation of the feed screws 248.

Then, since the upper ends of the feed screws 248 are fitted into the vertical grooves 28b of the eccentric cams 28, by the movement of the feed screws 248 in the direction of E shown by an arrow, the eccentric cams 28 are accordingly rotated centering around the support shafts 246. Therefore, distance from the center of the support shafts 246 to the cam surfaces 28a in contact with the lower surface of the lens case 216 is changed. Accordingly, the end part on the side where the feed screw 248 of the lens case is moved back and forth is moved vertically by an amount equal to the change of the eccentric amount. Whereby, the positional misalignment in the sub-scanning direction of the scanning lines at both ends in the main scanning direction (in a direction of C shown by arrow in FIG. 7) shown in FIG. 7 can be adjusted by rotating the feed screws 248.

Note that each of the support shafts 246 and 246 is supported by support shaft supporting members 249 and 249 (FIG. 7) so as to be freely rotatable. Therefore, even when each of the eccentric cams 28 is rotated, height of each support shaft 246 from the base 250A is not changed.

Figure 21:
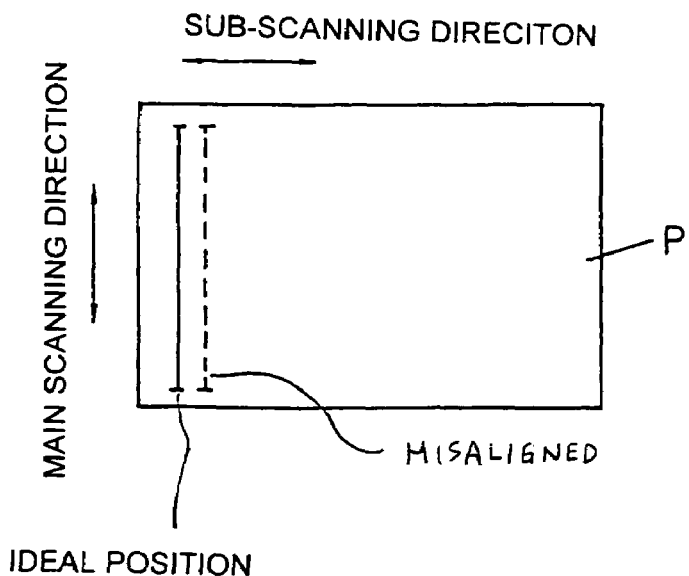
FIG. 21 is a schematic diagram for illustrating a case where scanning lines extending in a main scanning direction is deviated in parallel along the sub-scanning direction.

According to the optical scanner 26 having above-described structure, when the scanning line extending in the main scanning direction shown in FIG. 21 is deviated in parallel to the sub-scanning direction, the feed screws 248 and 248 on both sides are rotated by the same amount of rotation respectively and the corresponding image forming lenses 269, 270, 271, 272, by which the deviation is generated, are vertically moved in a direction of correcting the positional misalignment of the scanning lines, so as to correct the deviation in the sub-scanning direction.

Figure 22:
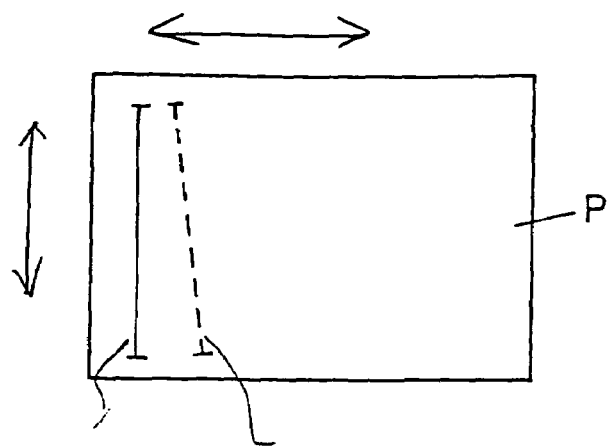
FIG. 22 is a schematic diagram for illustrating a case where the scanning line is inclined to the sub-scanning direction with respect to an ideal scanning line extending in the main scanning direction.
Figure 23:
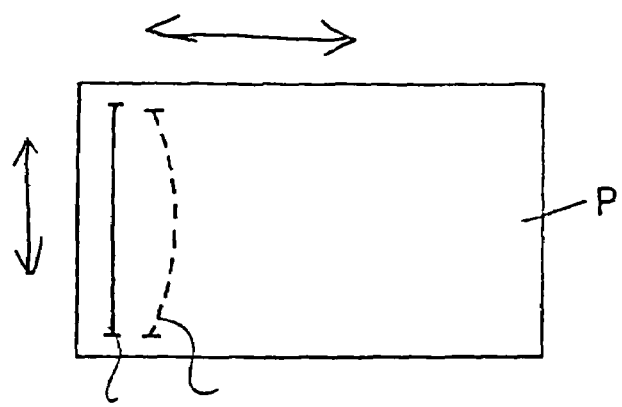
FIG. 23 is a schematic diagram for illustrating a case where the scanning line is curved in the sub-scanning direction with respect to the ideal scanning line extending in the main scanning direction.

Moreover, as show in FIG. 22, when the scanning line formed with respect to the ideal scanning line extending in the main scanning direction is inclined to the sub-scanning direction, only feed screw 248 of one side corresponding to the side where the scanning line is deviated in the sub-scanning direction is rotated, and only one end side of the respective image forming lenses 269, 270, 271, 272, by which the deviation is generated, is moved vertically, so as to adjust the image forming lenses in the sub-scanning direction.

The both ends or only one end side of the respective image forming lenses 269, 270, 271, 272 is vertically moved by rotating the feed screws 248 of the adjustment member 230, thereby moving the presser plates 247, and thereby changing the eccentric amount of the eccentric cams 28 rotating around the support shafts 246.

Accordingly, amounts of the vertical movement of the both ends of the image forming lenses 269, 270, 271, 272 are very small, compared with the rotational amount of the feed screws 248. Therefore, adjustment resolution for the resist deviation of the scanning lines in the sub-scanning direction is made to be small, thus obtaining excellent alignment accuracy.

Figure 12:
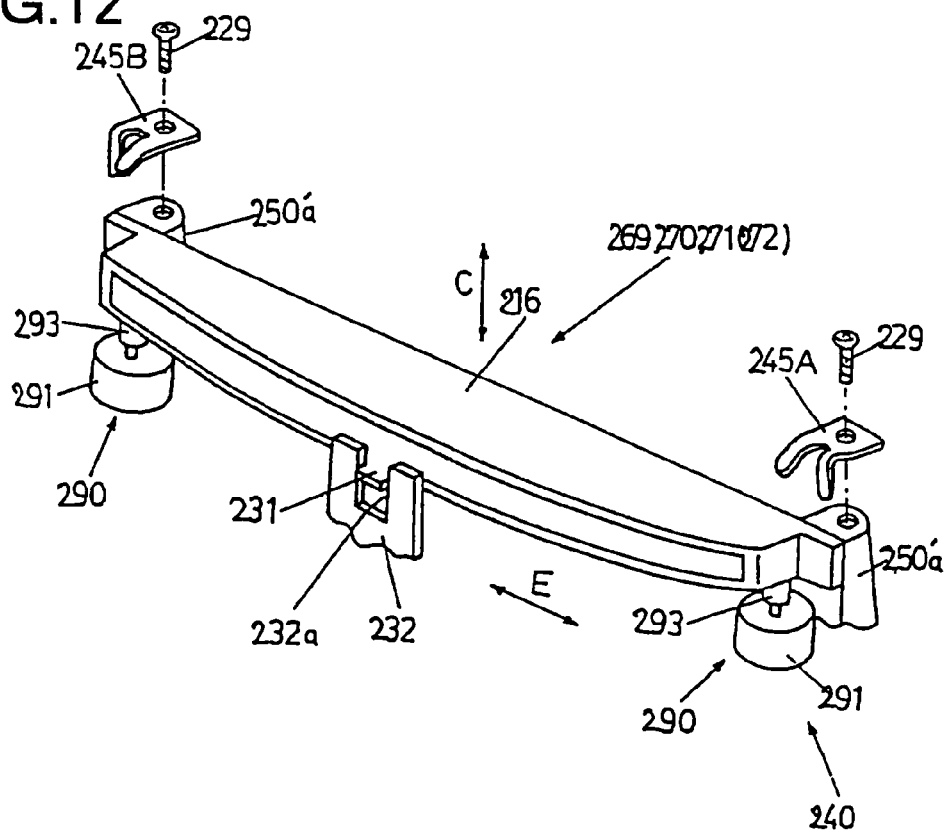
FIG. 12 is a schematic diagram of an optical scanner according to a third embodiment of the present invention.
Figure 13:
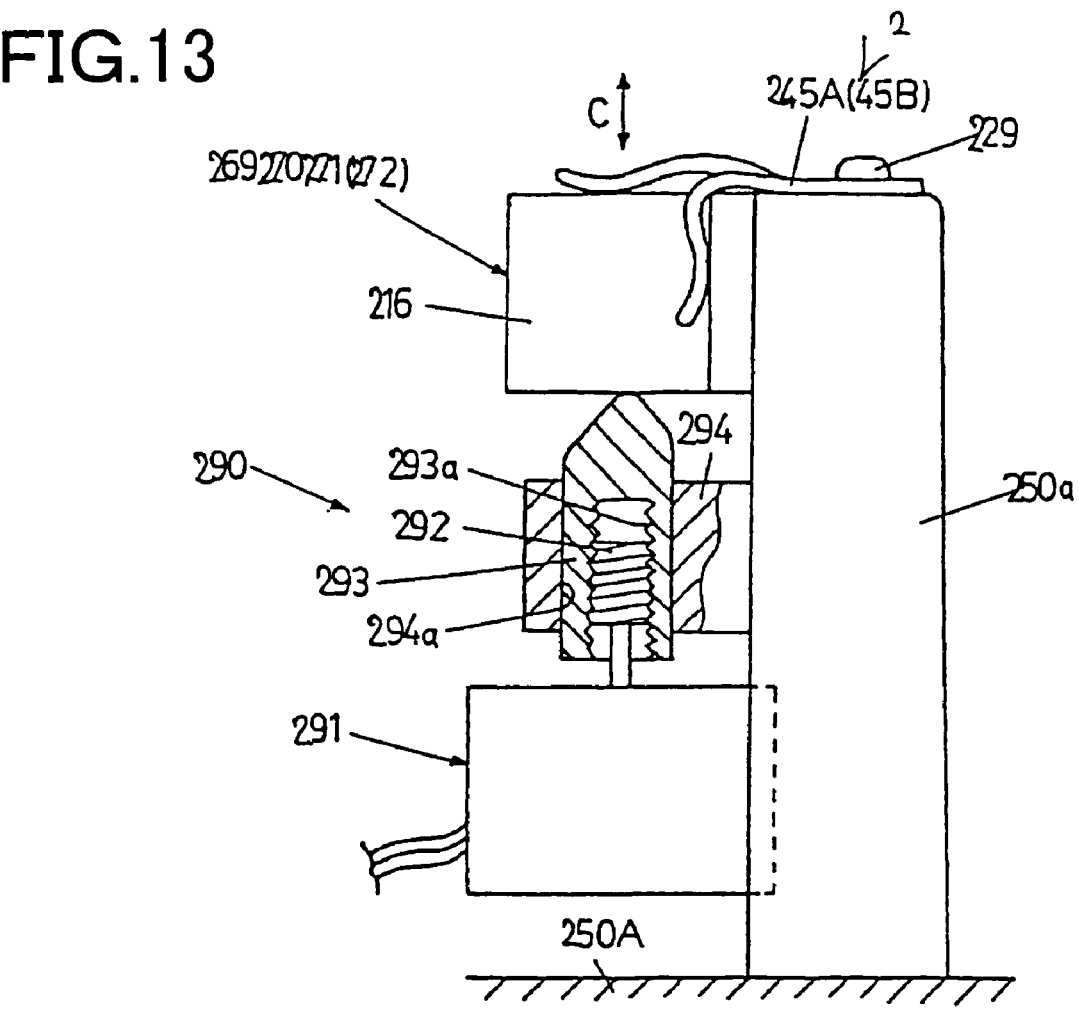
FIG. 13 is a partial side view of a sub-scanning position adjusting mechanism of the optical scanner according to the third embodiment.

FIG. 12 is a schematic diagram of an optical scanner according to a third embodiment of the present invention. FIG. 13 is a partial side view of a sub-scanning position adjusting mechanism of the optical scanner according to the third embodiment.

The optical scanner according to the third embodiment is different from the optical scanner 26 explained in FIG. 7 only in a structure of the adjustment member 240, in which both ends of the image forming lenses 269, 270, 271, 272 in the longitudinal direction are displaced in the sub-scanning direction shown by an arrow C.

The adjustment member 240 is disposed at both ends in the longitudinal direction of the image forming lenses 269, 270, 271 (it may also be disposed at an image forming lens 272). Moreover, the adjustment member 240 includes actuators 290 for displacing the longitudinal both ends of the image forming lenses 269, 270, 271 in the sub-scanning direction respectively.

The actuator 290 includes a stepping motor 291, a male screw 292 fixed to a rotary shaft of the stepping motor 291, an adjuster 293 having a female screw 293a which is engaged with the male screw 292, a housing attachment part 250a' integrally fixing thereto an adjuster holding part 294 for holding the adjuster 293 so as to be movable only in the sub-scanning direction of C shown by an arrow, and presser springs 245A and 245B for retaining the upper surfaces of both ends of the image forming lenses 269, 270, 271 to press them to the adjuster 293 side by a spring pressure.

Figure 14:
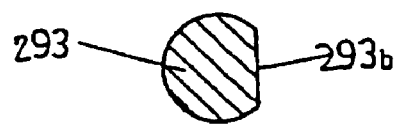
FIG. 14 is a cross section of an adjuster provided in the sub-scanning position adjusting mechanism shown in FIG. 13.

Tip side of each of the adjusters is tapered, the tip thereof is formed in an approximately hemispherical shape, and the tip parts thereof are respectively in contact with the underside at both ends of the lens case 216 of the image forming lenses 269, 270, 271. In the adjuster 293, other parts excepting the tapered tip parts are formed in an approximately cylindrical shape, and in a one part of the outer circumferential face thereof, as shown in FIG. 14, a planar part 293b is formed, making it formed into a shape of D in section.

Meanwhile, in the adjuster holding part 294, a D-shaped hole 294a is formed corresponding to the D-shaped sectional form of the adjuster 293. The adjuster 293 is inserted into the D-shaped hole 294a, thereby regulating the rotation of the adjuster 293 to move only in the sub-scanning direction of C shown by an arrow.

In the center of the adjuster 293, a closed-end hole is formed in an axial direction, thereby forming a female screw part 293a therein. A male screw 292 fixed to the rotary shaft of the stepping motor 291 is engaged with the female screw part 293a.

Note that in this embodiment the actuator 290 and the housing attachment part 250a' serve as holding members having a function to hold the image holding lenses 269, 270, 271, which serve as scanning lenses, so as to be movable in the sub-scanning direction.

In the optical scanner according to this embodiment, the paired actuators 290 and 290 of the adjustment member 240 shown in FIG. 12 are provided at both ends of the image forming lenses 269, 270, 271, so as to be independently drivable electrically. Therefore, when pulses for motor drive are transmitted to the stepping motor 291 of each actuator 290, the rotary shaft of the stepping motor 291 is rotated corresponding to the number of pulses. Then, the male screw 292 shown in FIG. 13 is accordingly rotated, thereby moving the adjusters 293 in a direction of C in FIG. 12. Whereby, positions of the both ends of the image forming lenses 269, 270, 271, or a position of one of them on the moving side is finely adjusted in the scanning direction of C shown by an arrow.

Therefore, according to the third embodiment, when a linear image (scanning line) is actually formed in the main scanning direction, when the deviation in the sub-scanning line with respect to an ideal scanning line linearly extending in the main scanning direction of the image is detected, and when each of the adjusters 293 is moved in a direction of correcting the deviation by controlling the driving stepping motor 291 electrically, then, the deviation of the image forming lenses 269, 270, 271 in the sub-scanning direction can be adjusted automatically.

In this way, according to the optical scanner of this embodiment, since the adjustment member 240 has the actuators 290 and 290, whose driving can be controlled, the positional misalignment of the scanning lines in the sub-scanning direction can be adjusted in a short time.

Figure 15:
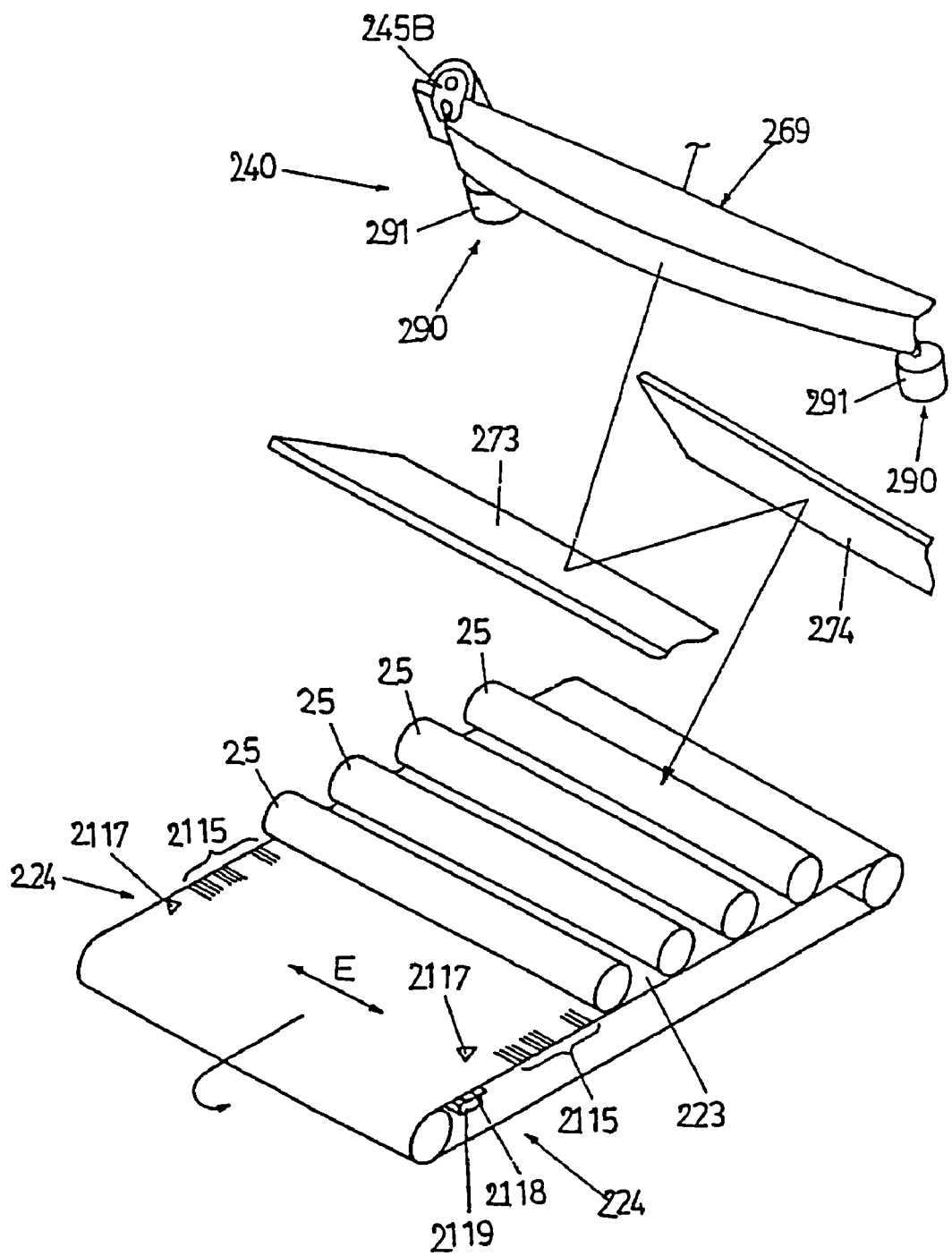
FIG. 15 is a schematic diagram of near a transfer belt of an image forming apparatus capable of correcting image misalignment automatically by reading positions of toner marks formed on an image carrier with a plurality of sensors.

FIG. 15 is a schematic diagram of near a transfer belt of an image forming apparatus capable of correcting image misalignment automatically by reading positions of toner marks formed on an image carrier with a plurality of sensors, and the deviation of the image read is automatically corrected.

The full-color image forming apparatus according to this embodiment includes the optical scanner explained in FIG. 12 to FIG. 14, and using the optical scanner, the image is formed on the transfer belt 223 through each photoreceptor drum 5. The photoreceptor drums 5 serve as four image carriers, and the transfer belt 223 also serve as an image carrier.

Moreover, the image forming apparatus includes a signal processing unit 2120 (see FIG. 16) functioning as means to correct and control the deviation in the sub-scanning direction of the image formed on the transfer belt 223 during regular image forming operation, by reading the position of toner marks 2115 and 2115, which are images for detecting the positional misalignment, formed on both ends on the transfer belt 223, with two (or three) sensors 224 and 224 provided by keeping an interval therebetween corresponding to the toner marks 2115 and 2115, and by driving the stepping motor 291 of each actuator 290 according to the position information of the image read by the sensors 224 and 224.

Note that in FIG. 15, in order to avoid complicatedness, only one image forming lens 269 and adjustment member 240 corresponding thereto are illustrated for four photoreceptor drums 25. However, in this embodiment, the image forming lens 269 and the adjustment member 240 are provided corresponding to each of the three photoreceptor drums 25 except for those for the black image (image forming lens 269 and adjustment member 240 may be provided corresponding to all of the four photoreceptor drums).

As described above, in FIG. 15, the two sensors 224 and 224 are arranged by keeping an interval therebetween in a direction of E shown by an arrow orthogonal to the main scanning direction, that is, in the moving direction of the transfer belt 223.

Each sensor 224 includes, light emitting elements 2117 for irradiating onto the upper surface of the transfer belt 223, a slit plate 2118 having a slit 2118a formed thereon so that the light irradiated from the emitting elements 2117 and transmitted through the transparent transfer belt 223 passes through, and light receiving elements 2119 for receiving the light passed through the slit 2118a.

Note that in this embodiment, by using a transfer belt 223 made of a transparent material, the light emitting elements 2117 and the light receiving elements 2119 are respectively arranged on both sides of the transfer belt 223. However, when the transfer belt 223 is not transparent, the slit plate 2118 and the light receiving elements 2119 are made to be arranged on the same side with the light emitting elements 2117. Whereby the light reflected by the belt face of the transfer belt 223 and passed through the slit 2118a is received by the light receiving elements 2119.

Figure 19:
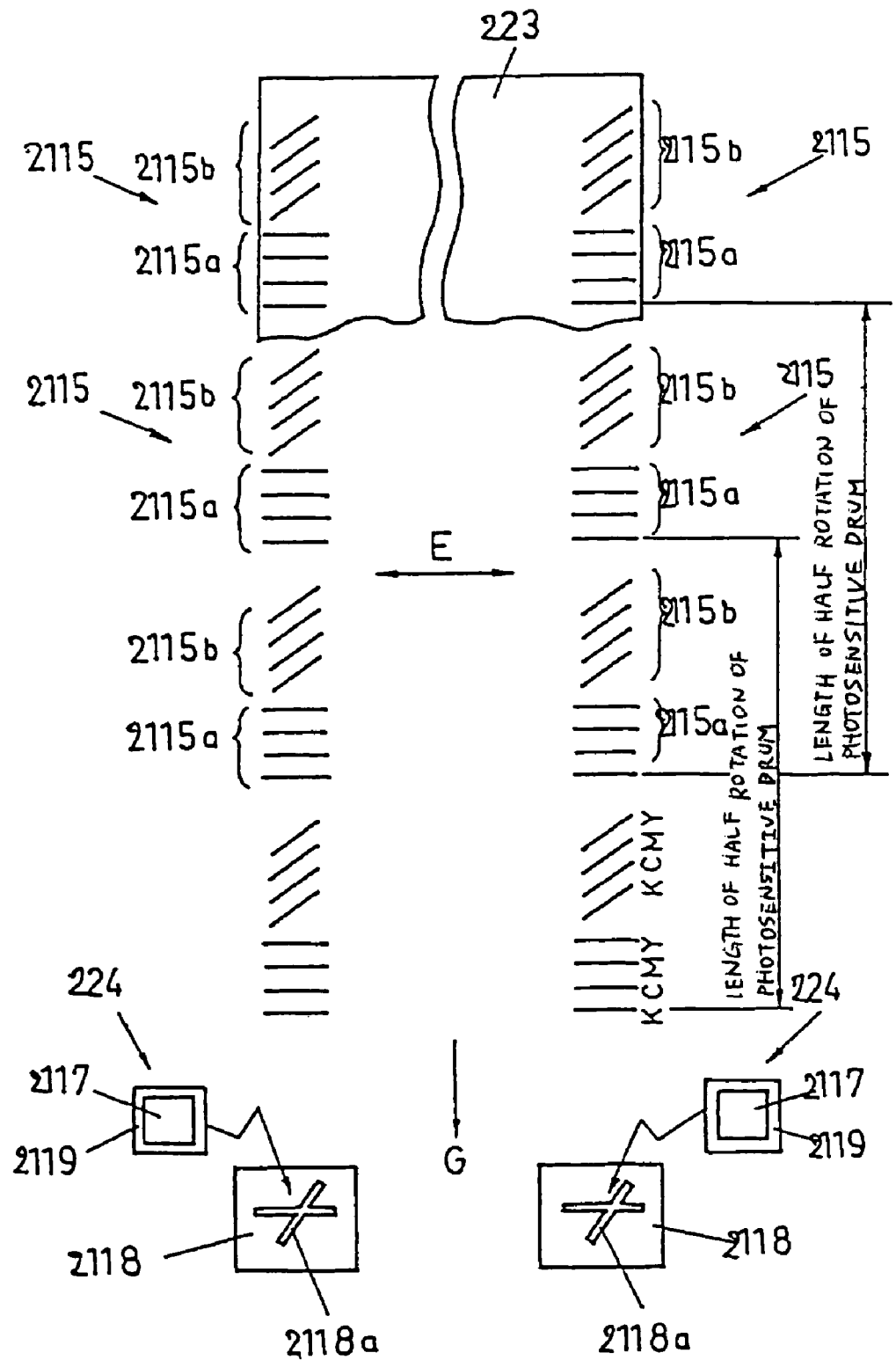
FIG. 19 is a schematic diagram for illustrating a position relation between a toner mark and a slit of the sensor.

The toner marks 2115 for detecting the positional misalignment of the scanning lines are formed at a position respectively opposed to the sensors 224 and 224 on both sides on the transfer belt 223. The toner marks 2115 consist of lateral line marks 2115a and oblique line marks 2115b. As shown in FIG. 19, the lateral line marks 2115a are linear toner marks in parallel to the main scanning direction (in a direction of E shown by an arrow), and the oblique line marks 2115b are linear toner marks inclined obliquely with respect to the lateral line marks 2115a.

The toner marks 2115 consist of four lateral line marks 2115a and four oblique line marks 2115b, and each of the four lateral line marks 2115a and the oblique line marks 2115b is a liner mark formed of a toner of each color of black (K), cyan (C), magenta (M), and yellow (Y). An arrangement of a plurality of such linear marks is formed along the moving direction of the transfer belt 223.

Note that, as shown in FIG. 19, continuous areas having two sets of four lateral line marks 2115a and four oblique line marks 2115b correspond to half circumferential length of each photoreceptor drum 25 (see FIG. 15).

Figure 18:
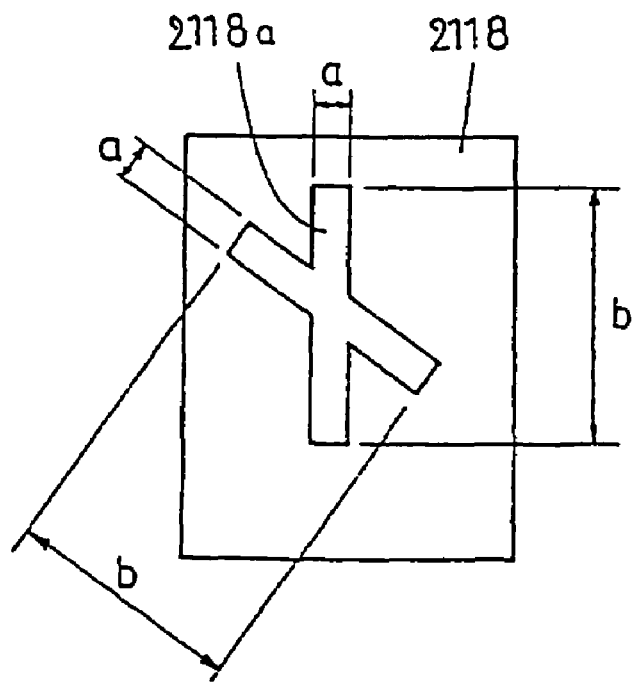
FIG. 18 is a schematic diagram of a slit plate of the sensor.

Meanwhile, the slit 2118a of the slit plate 2118 is a groove cut into a shape of X, having a lateral slit formed in the same direction with the lateral line marks 2115a of the toner marks 2115, and having an oblique slit formed so as to be inclined to the same direction with the oblique line marks 2115b. As shown in FIG. 18, the groove widths of the lateral slit and the oblique slit are respectively formed in dimensions (a). In addition, the groove lengths of the lateral slit and the oblique slit are respectively formed in dimensions (b).

Moreover, the width dimensions (thickness of line) of the lateral line marks 2115a and the oblique line marks 2115b are formed in the same dimensions with the groove width dimensions (a) of the lateral slit and the oblique slit shown in FIG. 18. However, the length dimensions of the lateral line marks 2115a and the oblique line marks 2115b are formed longer than the dimensions (b) of each groove length of the lateral slit and the oblique slit.

In this way, on both side ends of the transfer belt 223, as shown in FIG. 19, the toner marks 2115 consisting of four lateral line marks 2115a and four oblique line marks 2115b are continuously formed corresponding to the sensors 224 and 224 on both sides. Therefore, when the transfer belt 223 is moved in the sub-scanning direction shown by an arrow G, each of the toner marks 2115 and 2115 on both sides accordingly passes on each of the slits 2118a and 2118a sequentially.

Figure 17:
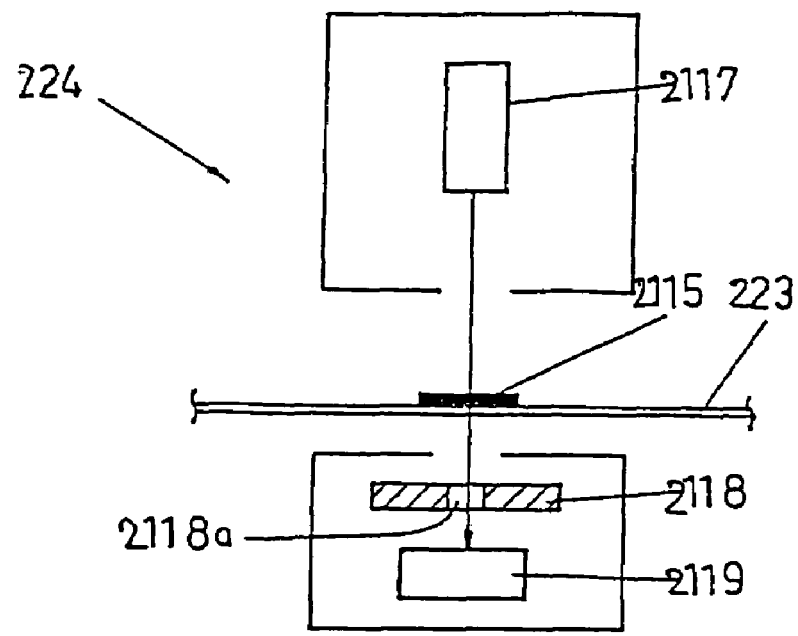
FIG. 17 is a schematic diagram of a sensor provided at both ends of the transfer belt.

At this time, when the toner mark 2115 is at a position corresponding to the part where no one of the lateral line marks 2115a or the oblique line marks 2115b of the toner marks 2115 is formed, the light receiving elements 2119 shown in FIG. 17 receive the light passed through the transparent transfer belt 223 as it is. Adversely, when the toner mark 2115 is at a position corresponding to the position of the slit 2118a, the receiving elements 2119 receive the light shielded by the toner marks 2115.

Accordingly, by processing power of the light receiving elements 2119 and 2119 on both sides according to a time series respectively, all passing timings of the four lateral line marks 2115a and four oblique line marks 2115b of the toner marks 2115 on both sides are found. Therefore, from each interval of the lateral line marks 2115a and the oblique line marks 2115b between each color on the transfer belt 223, the positional misalignment of the scanning lines between each color can be found.

Figure 24:
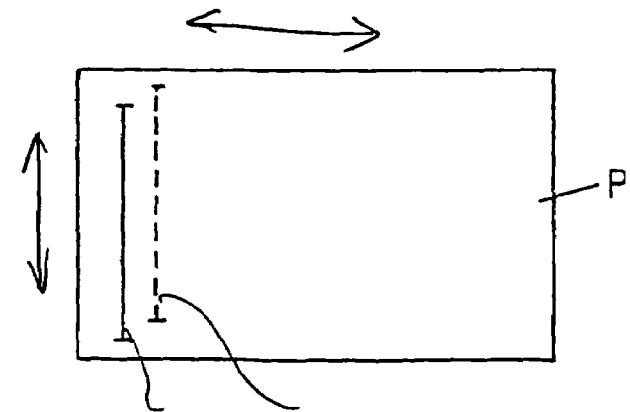
FIG. 24 is a schematic diagram for illustrating a case where a resist deviation in the main scanning direction is generated in a writing position of the scanning line with respect to the ideal scanning line extending in the main scanning direction.

Specifically, from the interval between the respective lateral line marks 2115a, the positional misalignment of the scanning lines in the sub-scanning direction (sub-scanning resist deviation) explained in FIG. 21 can be detected. In addition, when detecting signals of two lateral line marks 2115a formed on the same main scanning line are combined, tilt deviation of the scanning line explained in FIG. 22 can be detected. Further, by the detecting signals of the oblique line marks 2115b, the resist deviation in the main scanning direction of the scanning line explained in FIG. 24, and magnification deviation of the scanning line explained in FIG. 25 can be detected.

Figure 16:
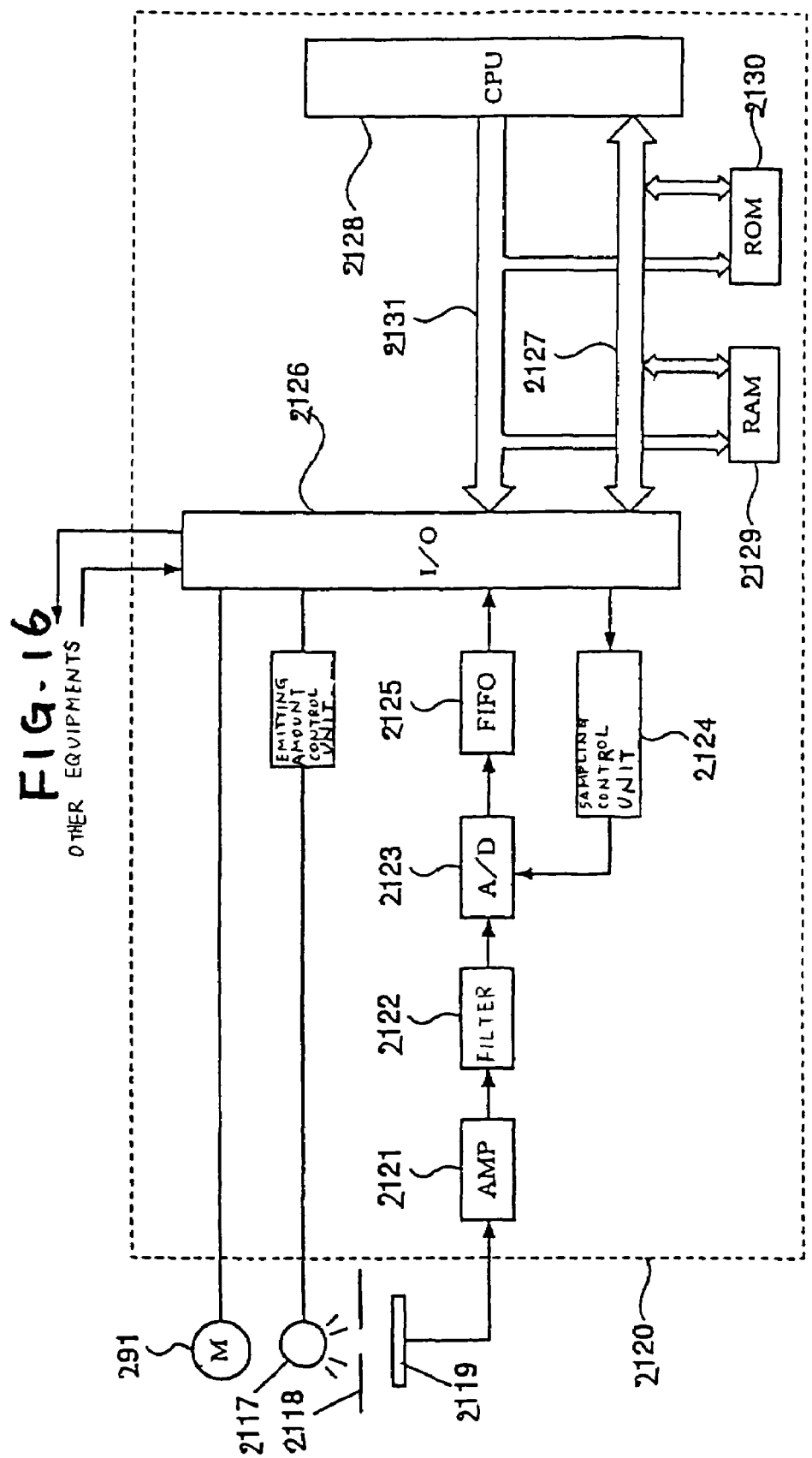
FIG. 16 is a block diagram of a signal processing unit that detects a misalignment of scanning lines.

The above-described deviations of the scanning lines are detected by a signal processing unit 2120 shown in FIG. 16.

The signals from each light receiving element 2119 on both sides are respectively inputted by the signal processing unit 2120. Note that, in FIG. 16, in order to simplify the drawing, only one light receiving element 2119 and its input system are illustrated. However, actually, there exist two signal input systems from the light receiving elements 2119 and 2119 on both sides. In the signal processing unit 2120, the detecting signals inputted from the light receiving elements 2119 are amplified by an AMP (amplifier). The amplified detecting signals are passed through a filter 2122 to pass only signal component of the toner mark 2115 for detecting the positional misalignment. The signal passed is then converted to digital data from analogue data by an A/D converter 2123, and the sampling of the data is controlled by a sampling control section 2124. Then, the data sampled is stored in a first-in-first-out (FIFO) memory 2125.

When a series of detection of the toner marks 2115 for detecting positional misalignment is ended, the data stored in the FIFO memory 2125 is loaded in a central processing unit (CPU) 2128 and a random access memory (RAM) 2129 by a data bus 2127 via an input/output (I/O) port 2126. The loaded data is then performed with proper arithmetic processing to calculate each kind of deviation amount. Then, in order to solve the deviation amount, arithmetic processing is performed and a result of the arithmetic processing is stored in the RAM 2129. When forming images, based on the result of the arithmetic processing, the image formation is controlled.

In a read only memory (ROM) 2130, various kinds of programs such as a program for arithmetically calculating a deviation amount are stored. Note that, a ROM address, a RAM address, and each type of input/output equipment are designated by an address bus 2131.

Moreover, in the CPU 2128, the detecting signals from the light receiving elements 2119 are monitored at a proper timing, a light emitting amount is controlled so that the deterioration of the transfer belt 223 and the light emitting elements 2117 can surely be detected, and the received light signals from the light receiving elements 2119 are controlled to keep the level constant at any time.

In this way, in the signal processing unit 2120, by conducting a signal processing in accordance with a detection result of the toner marks 2115, adjustment of the positional misalignment corresponding to the positional misalignment of the scanning lines of each color is automatically conducted by driving the stepping motors 291 and 291 on both sides of the adjustment member 240 shown in FIG. 15 by an amount (converted to the number of steps of a motor) corresponding to the positional misalignment.

Specifically, the adjustment of the positional misalignment is conducted in such a manner that when the scanning lines explained in FIG. 21 are deviated in parallel in the sub-scanning direction, the stepping motors on both sides 291 and 291 are rotated together by the same amount (the number of steps of a motor) corresponding to the deviation amount. Moreover, when the scanning lines explained in FIG. 22 are inclined obliquely to the sub-scanning direction and deviated, only the stepping motor 291 on one side corresponding to the side where the deviation is generated is rotated by the number of steps corresponding to the deviation amount. In this way, the deviation of the scanning lines of each color in the sub-scanning direction can be automatically adjusted.

Figure 20:
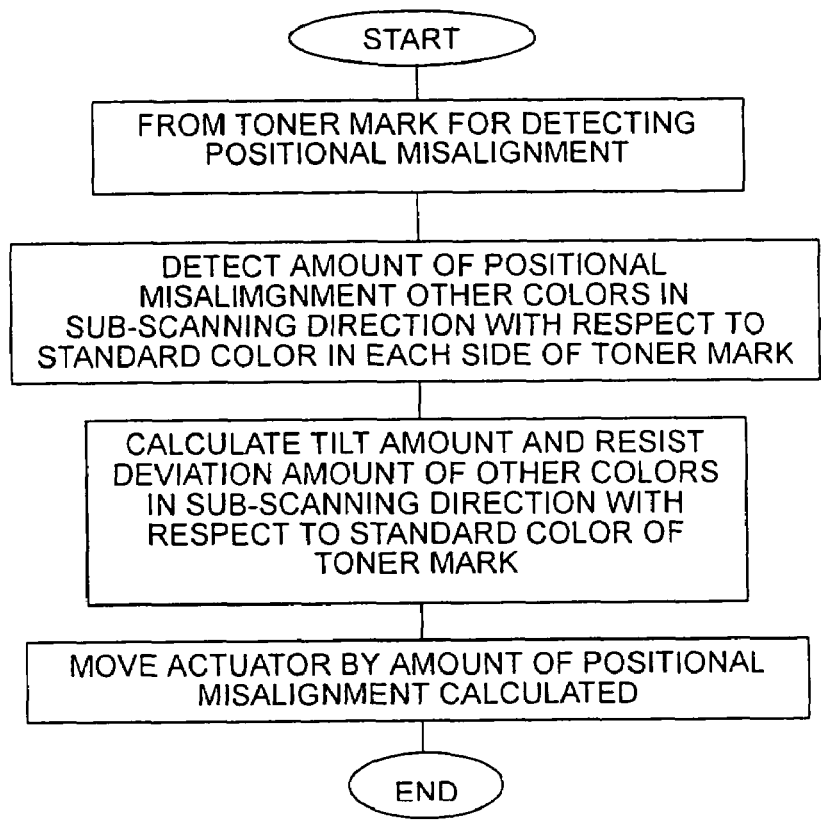
FIG. 20 is a flowchart of a resist deviation correction control by the signal processing unit.

FIG. 20 is a flow chart of a correction control of the resist deviation in the sub-scanning direction for correcting the resist deviation of the scanning lines in the sub-scanning direction.

From the signal processing unit 2120 shown in FIG. 16, a routine to apply the correction control of the resist deviation shown in FIG. 20 is started at predetermined timing.

First, in a first step, at a position corresponding to each of the sensors 224 and 224 on both ends on the transfer belt 23, the toner marks 2115 for detecting the positional misalignment, consisting of each of the lateral line marks 2115a and oblique line marks 2115b of a standard color and three colors other than the standard color, are respectively formed through the photoreceptor drums 25.

In the next step, each of the lateral line marks 2115a and oblique line marks 2115b of the toner marks 2115 formed on both ends on the transfer belt 223 are detected by the sensors 224 and 224 on both sides, and according to the detection result, the positional misalignment amount of other colors with respect to the standard color in the sub-scanning direction is detected in each of the toner marks 2115 on both ends.

Further, in the next step, from each of the positional misalignment amounts on both ends of the transfer belt 223 detected, the tilt amounts and the resist deviation amounts in the sub-scanning direction of the mark of other colors with respect to the mark of the standard color of the toner marks 2115 are obtained by arithmetically calculating.

Then, in the next step, each of the stepping motors 291 and 291 of the actuators 290 and 290 on both sides of the adjustment member 240 explained in FIG. 15 is respectively driven by an amount correcting the tilt amount and the resist deviation in the sub-scanning direction calculated.

In this way, in the image forming apparatus according to this embodiment, the image formation is automatically controlled in such a manner that the deviation of the scanning lines of three colors with respect to the scanning lines of one standard color in the sub-scanning direction is corrected to eliminate mutual deviation among scanning lines of four colors.

Here, when the standard color is selected to be black, for example, the adjustment member 240 is not provided on the optical path of the black, and instead the adjustment member 240 is provided on each of the three optical paths having the scanning lines of the color other than the standard color, that is the scanning lines of cyan, yellow, and magenta.

Specifically, the color image forming apparatus according to this embodiment has photoreceptor drums 25, which serve as four (N) image carriers, and the optical scanner has four optical paths for each color. Then, using the four optical paths, latent images can be formed respectively on each of the four photoreceptor drums 25. However, among the four optical paths, the adjustment member 240 is provided on each of the four−one=three optical paths for colors of cyan, yellow, and magenta.

In this way, in the color image forming apparatus according to this embodiment, each of the four scanning lines of different colors does not correspond to the ideal standard scanning line. However, three scanning lines formed using each of the three optical paths, on which scanning lines of the colors other than the standard color, that is, the scanning lines of cyan, yellow, magenta are formed, are adjusted so as to correspond to the scanning line by one standard color (black in the above-described example) selected from the four color scanning lines. Whereby, relative deviation of each of the four color scanning lines can be approximated to zero, thus satisfying the quality required as a color image.

Therefore, without lowering the quality as a color image, the adjustment member 240 is not required to be provided on the optical path of the standard color. This contributes to reducing the costs.

In addition, in a case of similar color image forming apparatus which has four (N) photoreceptor drums and four optical scanners having only a single optical path, and when latent images can be formed respectively on the four photoreceptor drums by using the four optical scanners, the above-described adjustment members 240 are provided to four−one=three optical scanners, thereby obtaining similar effects with the embodiments described above.

As described above, according to the optical scanner and the image forming apparatus equipped with the optical scanner, without deteriorating other characteristics, the tilt and curve of the scanning lines can be corrected, thereby realizing excellent alignment accuracy.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus comprising:
   an optical scanner including
      a scanning lens that is disposed in a main scanning direction as a longitudinal direction, and that transmits light from a light source;
      a scanning lens holding member that holds the scanning lens so that the scanning lens is movable in a sub-scanning direction; and
      an adjustment unit including two eccentric members that are disposed on both ends of the scanning lens, and rotate centering around each of supporting axes that are perpendicular to both the main scanning direction and the sub-scanning direction, respectively; and an eccentric amount adjustment unit that respectively adjusts eccentric amounts of the eccentric members, wherein outer surfaces of each of the eccentric members make a contact with the both ends of the scanning lens, respectively, and both ends of the scanning lens are displaced in a sub-scanning direction based on the eccentric amounts that change with a rotation of the eccentric members.

2. The image forming apparatus according to claim 1, further comprising:

a detecting unit that detects a toner mark on a belt; and a driving unit that drives the adjustment unit based on a result of the detection.

3. An image forming apparatus, comprising:

an optical scanner including a scanning lens that is disposed in a main scanning direction as a longitudinal direction, and that transmits light from a light source;

a scanning lens holding member that holds the scanning lens so that the scanning lens is movable in a sub-scanning direction; and an adjustment unit that is disposed on each of longitudinal ends of the scanning lens, and that displaces the longitudinal ends in the sub-scanning direction;

a detecting unit that detects a toner mark on a belt; and a driving unit that drives the adjustment unit based on a result of the detection, wherein the adjustment unit is provided with an actuator that is driven electrically.

4. The image forming apparatus according to claim 3, comprising:

an optical scanner including a scanning lens that is disposed in a main scanning direction as a longitudinal direction, and that transmits light from a light source;

a scanning lens holding member that holds the scanning lens so that the scanning lens is movable in a sub-scanning direction; and an adjustment unit that is disposed on each of longitudinal ends of the scanning lens, and that displaces the longitudinal ends in the sub-scanning direction, wherein the adjustment unit is provided with an actuator that is driven electrically;

a plurality of sensors that is disposed in the main scanning direction with a predetermined interval to read a position of an image formed on an image carrier; and a compensating unit that compensates misalignment of the image in the sub-scanning direction by driving the actuator based on information on the position of the image read.

5. The image forming apparatus according to claim 1, wherein the actuator has an adjuster provided at both front ends respectively in the longitudinal direction of the scanning lens, and the adjuster is shaped in diminution, a front end thereof abuts a casing of the scanning lens such that the scanning lens is movable only in the sub-scanning direction, the front end configured to be movable in the sub-scanning direction by moving the corresponding adjuster in the sub-scanning direction.

6. The image forming apparatus according to claim 1, wherein a regulating unit is provided at a central part of the scanning lens in the longitudinal direction that regulates movements of the scanning lens in the main-scanning direction.

7. A color image forming apparatus comprising:

an optical scanner including a scanning lens having a curved surface centering around an optical axis;

a scanning lens holding member that holds the scanning lens, having a receiving surface that supports the curved surface; and an adjustment member that rotates the scanning lens, with the optical axis as a rotating center, to adjust a position of the scanning lens; and N image carriers on each of which a latent image is formed, wherein the optical scanner has N optical paths so that the latent image is formed on each of the N image carriers through the N optical paths, and the adjustment member is disposed on each of N−1 optical paths among the N optical paths.

8. The image forming apparatus according to claim 1, further comprising:

N optical scanners, each of the optical scanners including a scanning lens that is disposed in a main scanning direction as a longitudinal direction, and that transmits light from a light source;

a scanning lens holding member that holds the scanning lens so that the scanning lens is movable in a sub-scanning direction; and an adjustment unit including two eccentric members that are disposed on both ends of the scanning lens, and rotate centering around each of supporting axes that are perpendicular to both the main scanning direction and the sub-scanning direction, respectively; and an eccentric amount adjustment unit that respectively adjusts eccentric amounts of the eccentric members, wherein outer surfaces of each of the eccentric members make a contact with the both ends of the scanning lens, respectively, and both ends of the scanning lens are displaced in a sub-scanning direction based on the eccentric amounts that change with a rotation of the eccentric members; and N image carriers on each of which a latent image is formed, wherein the optical scanner has a single optical path, the latent image is formed on each of the N image carriers via the N optical scanners, and the adjustment unit is disposed on each of N−1 optical scanners.

* * * * *